July 31, 1956  C. A. LEE  2,756,649
FLOW CONTROL APPARATUS
Filed Aug. 18, 1951  9 Sheets-Sheet 1

Inventor
Charles A. Lee
By Soans, Glaister & Anderson
Attorneys

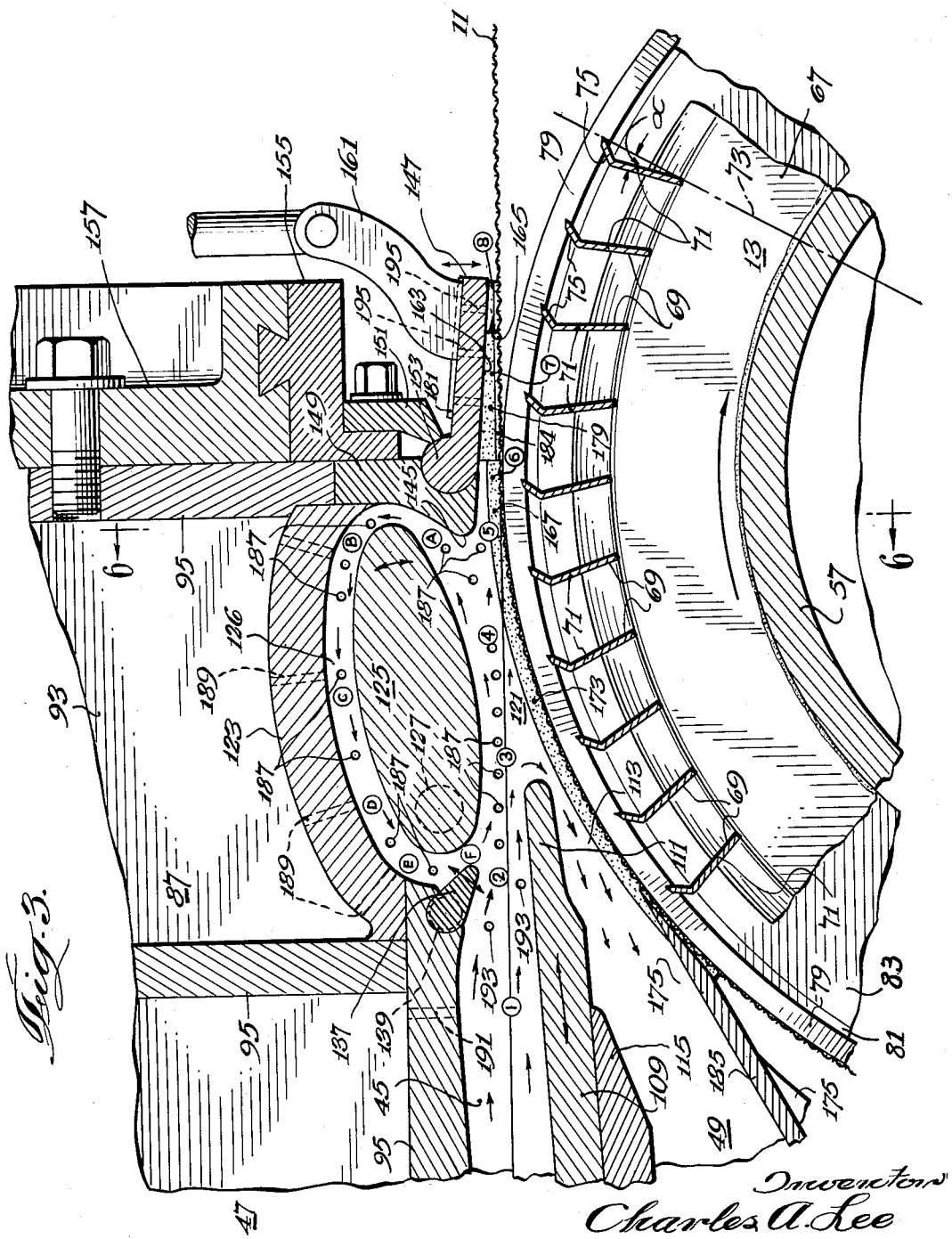

July 31, 1956  C. A. LEE  2,756,649
FLOW CONTROL APPARATUS
Filed Aug. 18, 1951  9 Sheets-Sheet 3
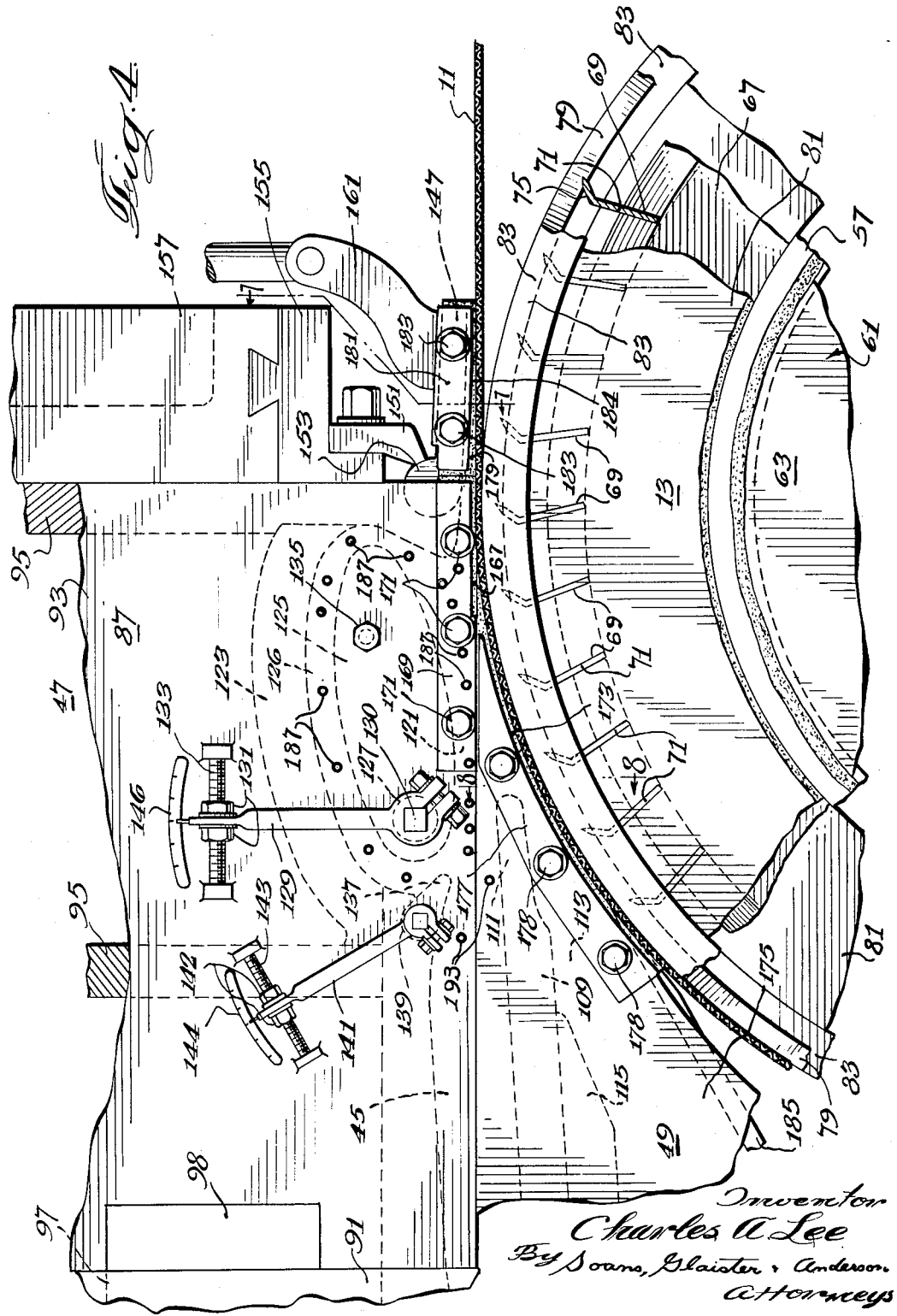
Inventor
Charles A Lee
By Soans, Glaister & Anderson
Attorneys

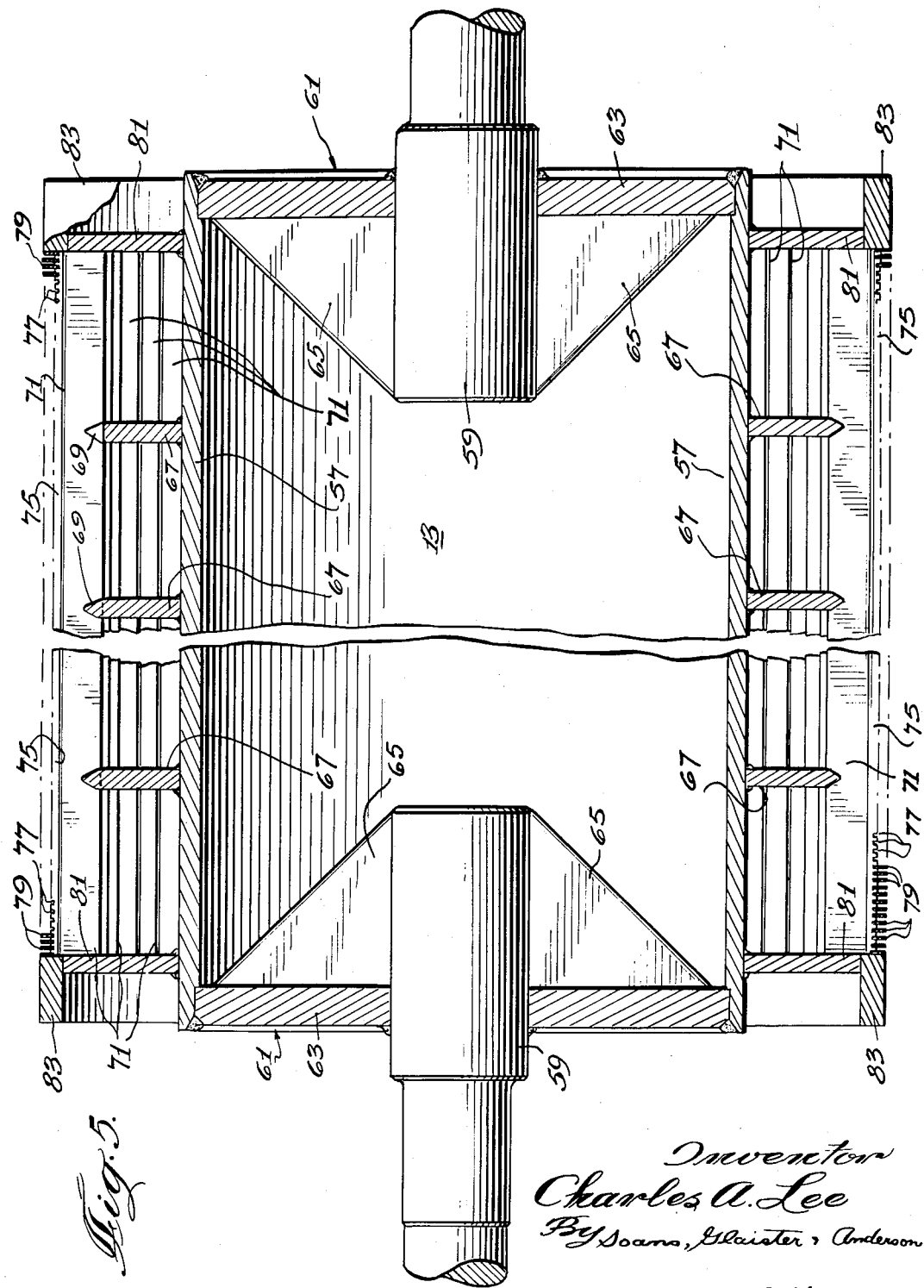

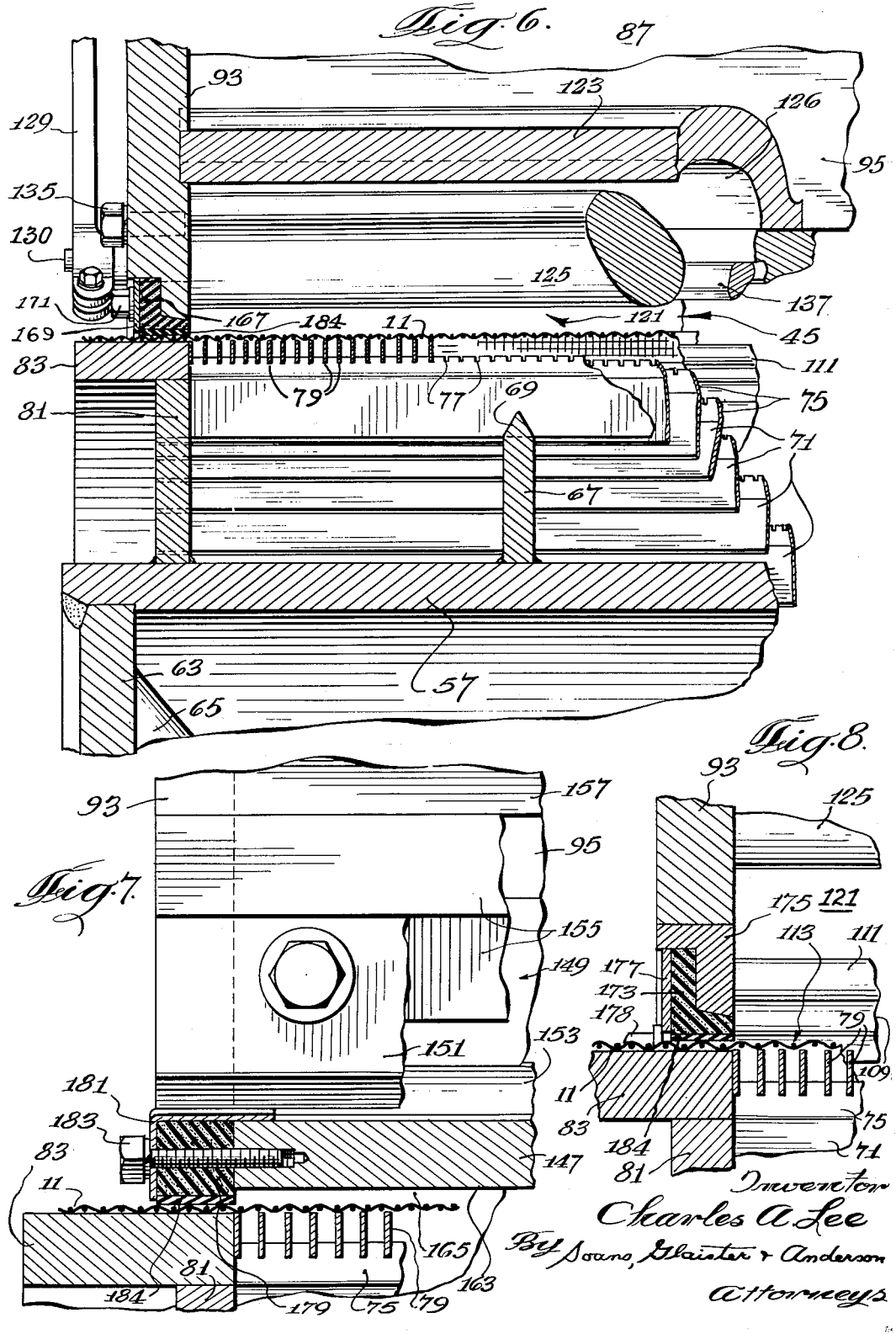

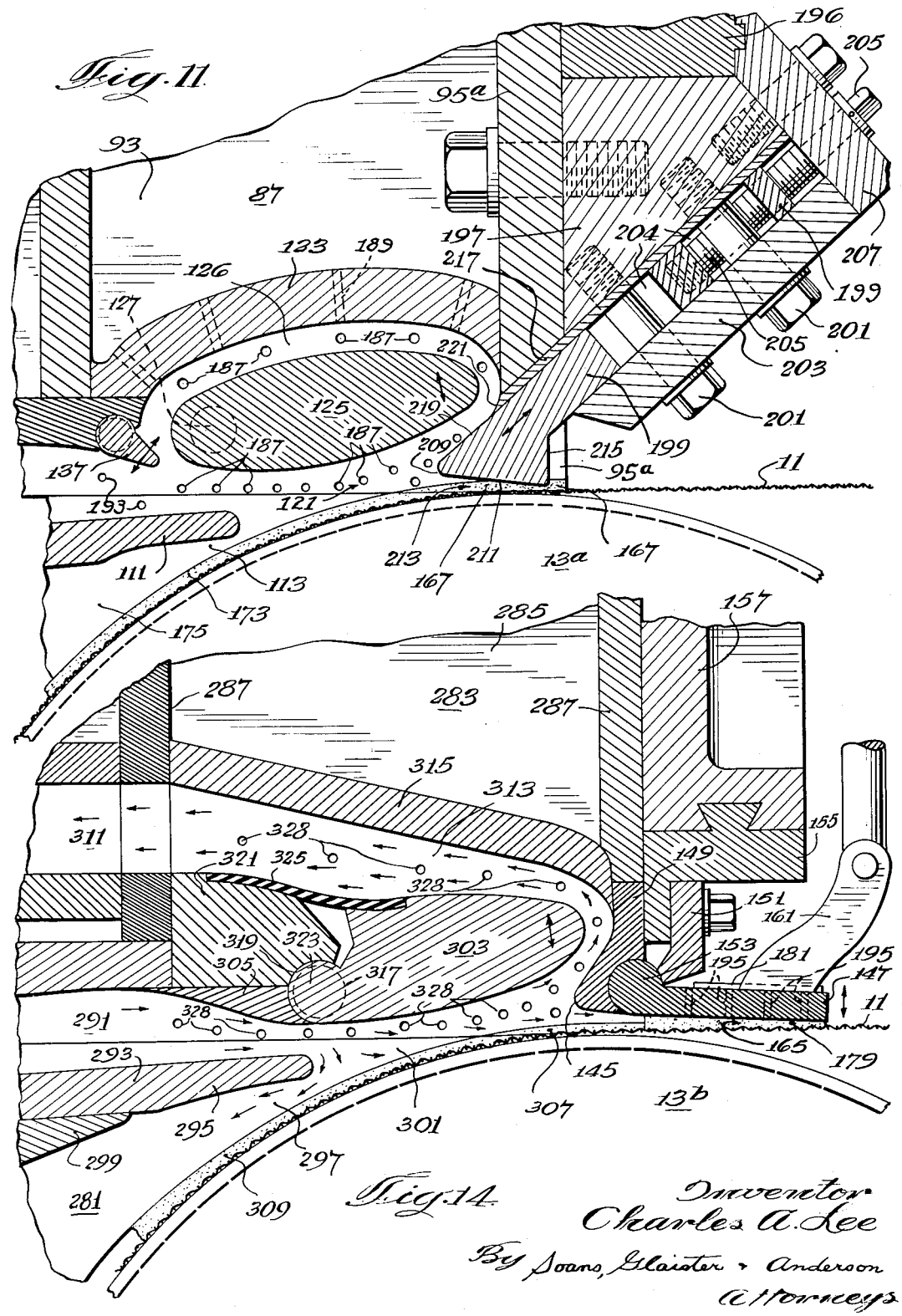

July 31, 1956   C. A. LEE   2,756,649
FLOW CONTROL APPARATUS
Filed Aug. 18, 1951   9 Sheets-Sheet 8
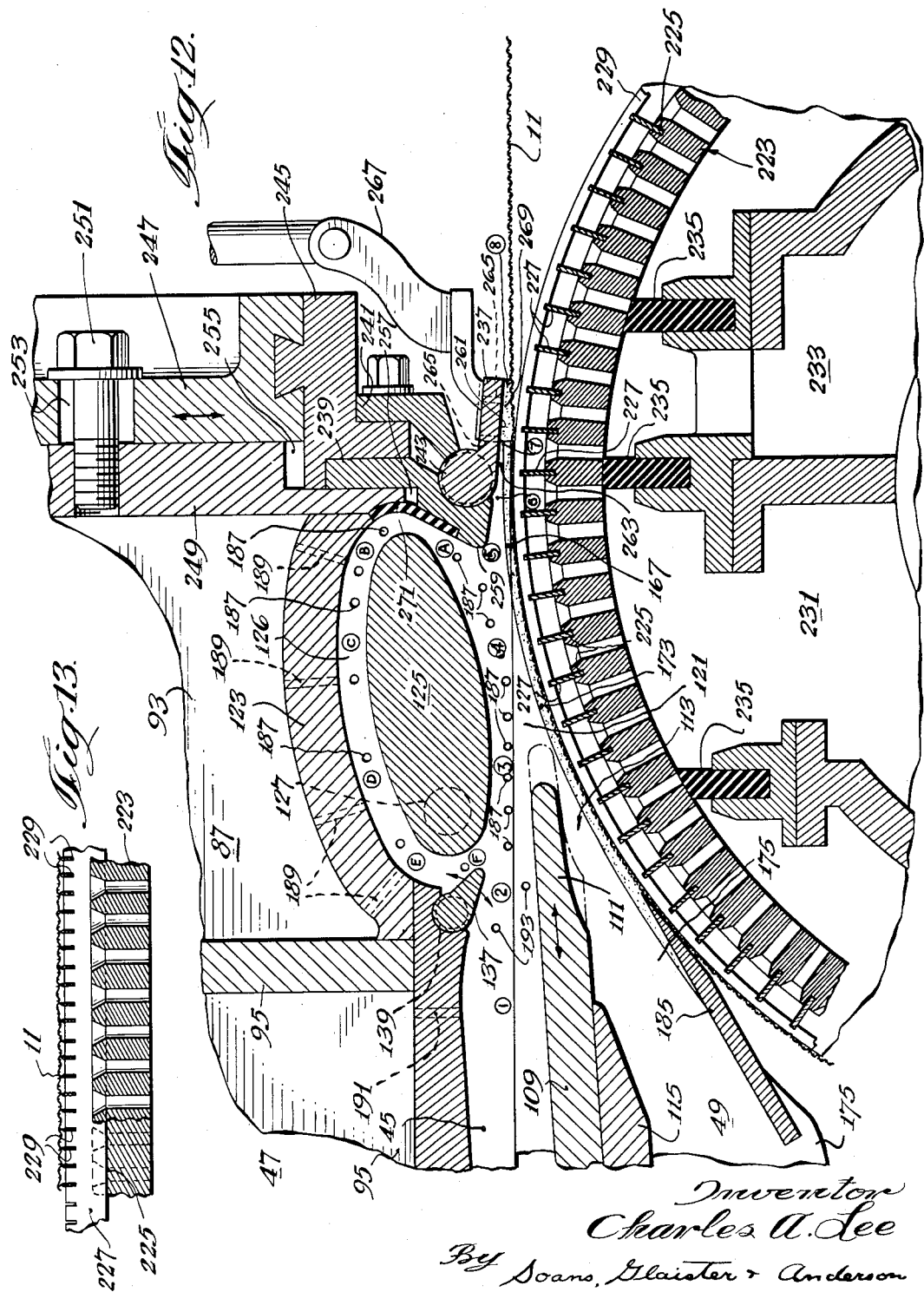

July 31, 1956

C. A. LEE 2,756,649

FLOW CONTROL APPARATUS

Filed Aug. 18, 1951

Inventor
Charles A. Lee
By Soans, Glaister & Anderson
Attorneys

United States Patent Office 2,756,649
Patented July 31, 1956

2,756,649

FLOW CONTROL APPARATUS

Charles A. Lee, Neenah, Wis., assignor, by mesne assignments, to Kimberly-Clark Corporation, a corporation of Delaware Application August 18, 1951, Serial No. 242,519

17 Claims. (Cl. 92—44)

The present invention relates to the manufacture of felted web and sheet products from fluid suspensions of fibrous materials, and has particular relation to the manufacture of paper on Fourdrinier papermaking machines. As will hereinafter appear, the invention has especial advantage when applied to the manufacture of paper on Fourdrinier papermaking machines of the inlet or pressure-forming type, which are provided with open type breast rolls.

In the operation of inlet or pressure forming type papermaking machines, the aqueous suspension of fiber and any other papermaking materials to be used, which suspensions are commonly designated as "stock," is supplied to a web-forming region, through which the Fourdrinier wire is moved, as a relatively high energy, flowing stream which may be under substantial hydraulic pressure. Examples of these machines are shown in United States Patent Nos. 2,060,808, 2,225,435 and 2,308,370. Prior to the development of the inlet or pressure forming type papermaking machine, it was the general practice in the operation of Fourdrinier papermaking machines to form the mat of fibers of which the paper web is composed by applying to the upper surface of the Fourdrinier wire, as by flowing thereon, a layer of stock which was then caused or permitted to drain through the wire. The stock contained the required amount of fiber in an amount of water which was sufficient to produce the proper distribution of the fibers in the web, and sufficient drainage was effected during the period of time the formed web remained on the wire to produce a coherent sheet, capable of being couched-off the end of the wire. Various arrangements, including suction boxes, table rolls and water doctors were disposed beneath the wire for increasing the rate of drainage therethrough, and since there was no substantial pressure differential in the web-forming region along the wire, the speed of operation of these machines was determined primarily by the capacity and effectiveness of the drainage means.

In contrast with this arrangement, in the inlet or pressure forming type machine, the stock is applied to a restricted area section of the moving Fourdrinier wire as a confined, relatively high energy, flowing stream which is usually under substantial hydraulic pressure. A large proportion of the water in the stock mixture is thus forced through the wire in the web-forming region at relatively high velocity, primarily as a result of the substantial pressure differential across the forming wire within that region. At the same time, since the stock is delivered to the web-forming region at a velocity which is at least a function of the velocity of the wire, the usual pressure forming machine is capable of being operated at a much higher speed than the earlier types of Fourdrinier papermaking machines, as described above.

Pressure forming type machines, although quite widely used in the papermaking industry, possess certain inherent operational difficulties, especially when operated at speeds in excess of from about 1500 to 2000 feet per minute. For example, one difficulty, which is quite generally encountered, is the existence of cyclic or intermittent conditions of flow instability within the flowing stream of stock being delivered to the web-forming region in or adjacent that region. This condition is discussed in my prior applications, Serial Nos. 121,525 and 196,893, which were filed on October 15, 1949 and November 21, 1950, which are assigned to the assignee of this invention, and of which this application is a continuation in part.

Both of these prior applications disclose arrangements for overcoming this particular type of instability and set forth in some detail certain operational principles in connection therewith. The latter filed application also discloses certain additional principles in connection with the control of web-forming operations generally, and especially the control of web-forming in connection with the operation of pressure forming type Fourdrinier papermaking machines. More specifically, application Ser. No. 196,893 discloses certain basic principles applicable to the control and adjustment of the pressure and velocity conditions (including direction of flow) existing within the web-forming region of pressure forming and other apparatus. The utilization of the principles and apparatus disclosed in these said applications makes possible the manufacture of fibrous webs from fluid suspensions at much higher speeds and with much better control of the character and arrangement of the constituent fibers of the web than has heretofore been possible.

As previously pointed out, the present invention is directed to the same general problem as my said prior applications, i. e. the provision of improved apparatus and methods for the manufacture of felted fibrous webs from fluid suspensions of fibrous materials. Moreover, the realization of all of the possible advantages of the present invention involves the use of certain of the principles and arrangements disclosed in my said prior applications for accomplishing the control of the pressure and velocity relationships existing within the web-forming region of the machine. In addition, however, the present invention includes, and is to a large extent based upon, the discovery that unexpectedly effective control of the pressure and velocity relationships existing within the web-forming region of, for example, a pressure forming type Fourdrinier papermaking machine, can be accomplished by the use of certain specialized designs of the flow passageway or passageways through which the fluid suspension is delivered to the web-forming region.

In its broadest aspects, the present invention accomplishes its objective by so controlling the dimensions of the flow path through which the flowing stream of stock or other fluid suspension of fibrous material is delivered to, and directed against, the web-forming member, in the web-forming region of the machine, that that stream, at least on the web-forming side of the web-forming member, is caused to flow under conditions of curvilinear flow.

In certain preferred embodiments of the invention, as applied to a pressure forming type Fourdrinier machine, to be hereinafter described, the flow passageways within the inlet are so designed that the flowing stream of stock delivered to the web-forming region is divided into three main parts. One of these parts is caused to flow backwardly along the wire as it moves into the web-forming region, another is caused to flow through the wire or other forming member to form the web, and the third is conducted away from the web-forming region within the inlet, being preferably recirculated therein. Normally, there is also a minor division of the stock flow which flows out of the web-forming region with the formed web. In each of these embodiments, however, the stock is delivered to the web-forming region under conditions of curvilinear flow, and it may be delivered to the web-forming region under conditions of expanding flow, i. e. curvilinier flow under such conditions that there is an increasing pressure in the direction of stream flow.

The defining surfaces of the flow passageways which control the flow of the fibrous suspension in the web-forming region in accordance with the principles of the invention constitute surfaces which are substantially coincident with the surfaces of streamlines under conditions of potential flow. Also, when the flow is to be divided into three main parts in the web-forming region, which is the preferred mode of practicing the invention, the structures employed include means for varying the relative proportion of stock in each of these three divisions. The various arrangements, specific embodiments of which will be hereinafter described, are capable of accomplishing unexpectedly efficient control of the pressure and velocity relationships of the stock delivered to the web-forming region. Thus, the invention accomplishes important permissive increase in the speed of operation of papermaking and other web-forming machines wherein it is used and important improvement in the quality of the product produced on such machines.

In the construction and use of flow control means which, in accordance with the invention, utilize flow passageways defined by surfaces which are substantially coincident with the surfaces of streamlines under conditions of potential flow, it is necessary to establish and maintain definite design and operational relationships. These and other features of the invention will be illustrated in the accompanying drawings and the following description of certain preferred embodiments of the invention, as applied particularly to pressure forming or inlet type Fourdrinier papermaking machines.

In the drawings:

Figure 3 is an enlarged, fragmentary, sectional view of the flow control mechanism and the web-forming region of the machine illustrated in Figures 1 and 2;

Figure 4 is a side elevational view, drawn to the same scale as Figure 3, illustrating certain of the details of the adjustable control means for the flow control mechanism illustrated in section in Figures 2 and 3;

Figure 5 is an enlarged, sectional view of the open type breast roll which constitutes a part of the apparatus illustrated in Figures 1 to 4;

Figure 6 is an enlarged, fragmentary sectional view taken on the general line 6—6 of Figure 3. The view illustrates certain of the features of the breast roll construction and the edge seal means embodied in the apparatus;

Figure 9:
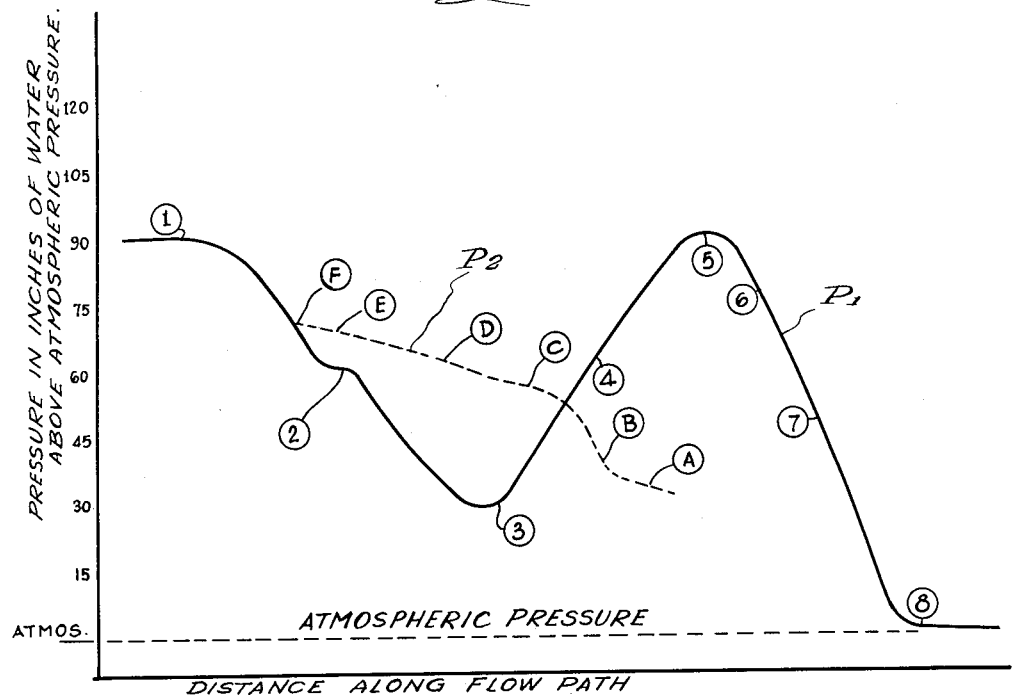
Figure 10:
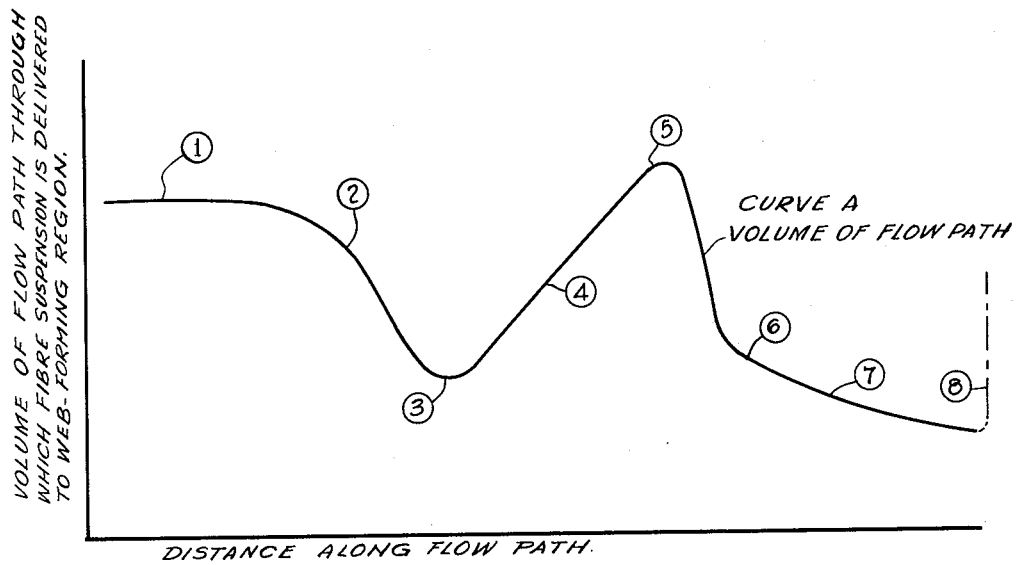
Figure 15:
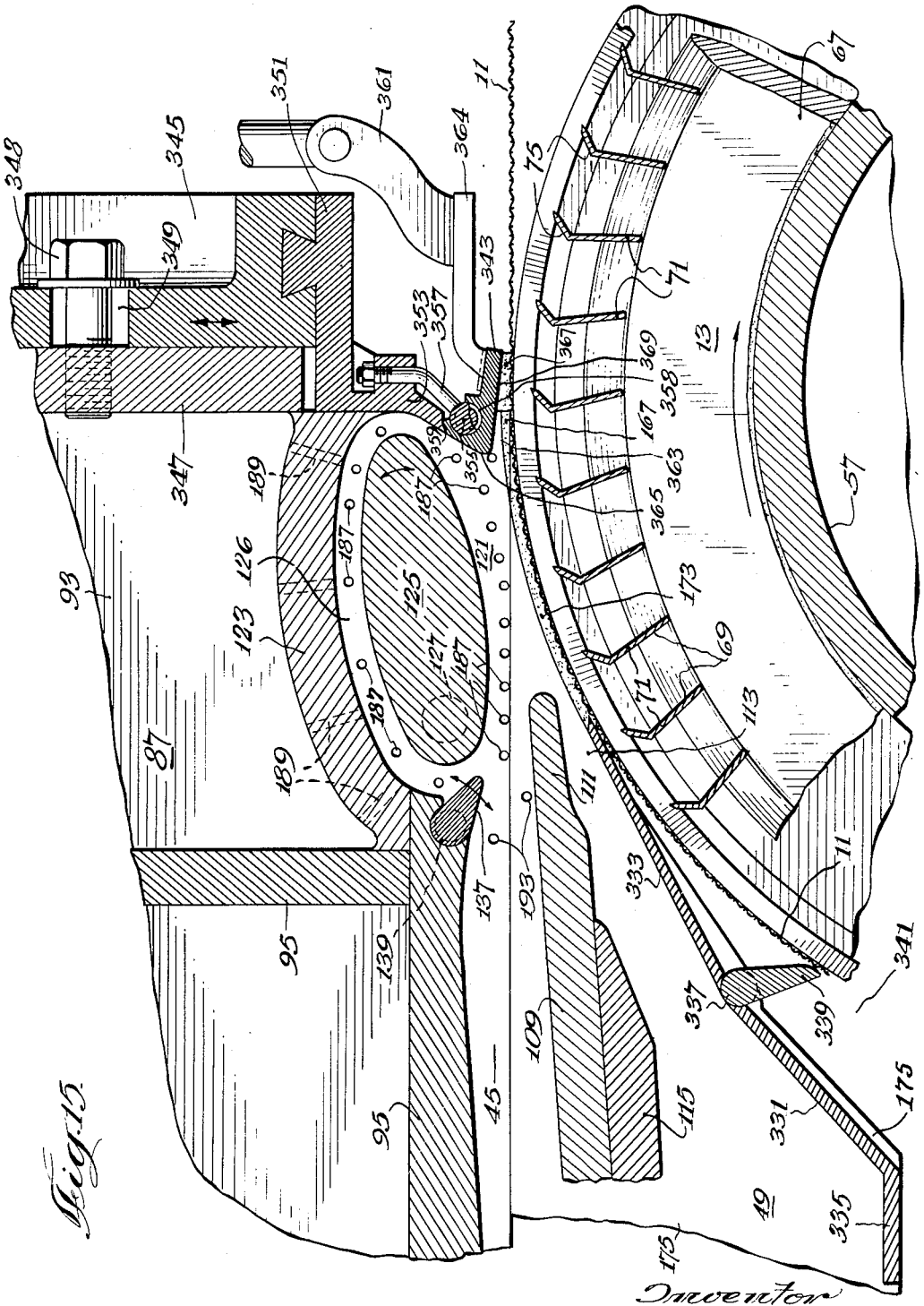

Figures 7 and 8 are fragmentary views, taken on the general lines 7—7 and 8—8 of Figure 4, illustrating certain of the features of other of the edge seal means used in conjunction with the apparatus shown in the several figures of the drawings;

Figure 9 is a plot which exemplifies the pressure relationships existing under various operating conditions in the web-forming region of apparatus of the general type shown in Figures 2 to 6;

Figure 10 is a plot, illustrating the general relationship of the volume of the flow path adjacent the web-forming region in apparatus in accordance with the invention;

Figure 11 is a fragmentary view, to the same scale as Figure 3, illustrating a modified exit or slice structure particularly adapted for use in connection with web-forming apparatus in accordance with the invention;

Figure 12 is an enlarged, fragmentary view, similar to Figure 3, of another embodiment of flow control apparatus in accordance with the invention;

Figure 13 is a fragmentary view showing certain of the details of the suction type breast roll which constitutes a part of the apparatus illustrated in Figure 12; and Figures 14 and 15 are enlarged, fragmentary sectional views, also similar to Figure 3, of other embodiments of flow control apparatus in accordance with the invention.

In my prior application, Serial No. 196,893, it has been shown that materially improved web formation, together with substantially increased operational speeds, can be attained in apparatus wherein fibrous webs are being formed on a moving wire, or other web-forming member, by the use of fluid suspensions of fibrous material, by establishing certain pressure and velocity relationships within the web-forming region. Also, in my said prior application, there has been disclosed certain methods and apparatus for accomplishing control of these relationships. In general, the methods and the apparatus disclosed in my said application involve the controlled addition to the fluid suspension of fibrous material which contacts the moving, fluid-permeable, forming member of substantial amounts of mechanical energy.

In distinction from this arrangement, the present invention contemplates the attainment of control of the pressure and velocity relationships, within certain limits, without the addition of mechanical energy to the flowing stream delivered to the web-forming region. More specifically, the invention contemplates the attainment of the desired control by the use of flow control means which is provided with flow passageways of such design that the flowing stream of fluid within the web-forming region reaches the web-forming member under conditions of curvilinear or non-rectilinear flow, and preferably under conditions of expanding curvilinear flow. By this means, an increasing pressure or positive pressure gradient is produced along any streamline above the web-forming member and a pressure differential is produced across the web-forming member within the web-forming region, which differential increases in the direction of movement of that member. The invention further contemplates the use of flow control means wherein the flow passageways are defined at least in part by adjustable, flow control vane means of particular geometry and dimensions, and the division of the flowing stream of fibrous suspensions into a plurality of portions, only one of which is used to form the web on the fluid permeable web-forming member.

Figure 1:
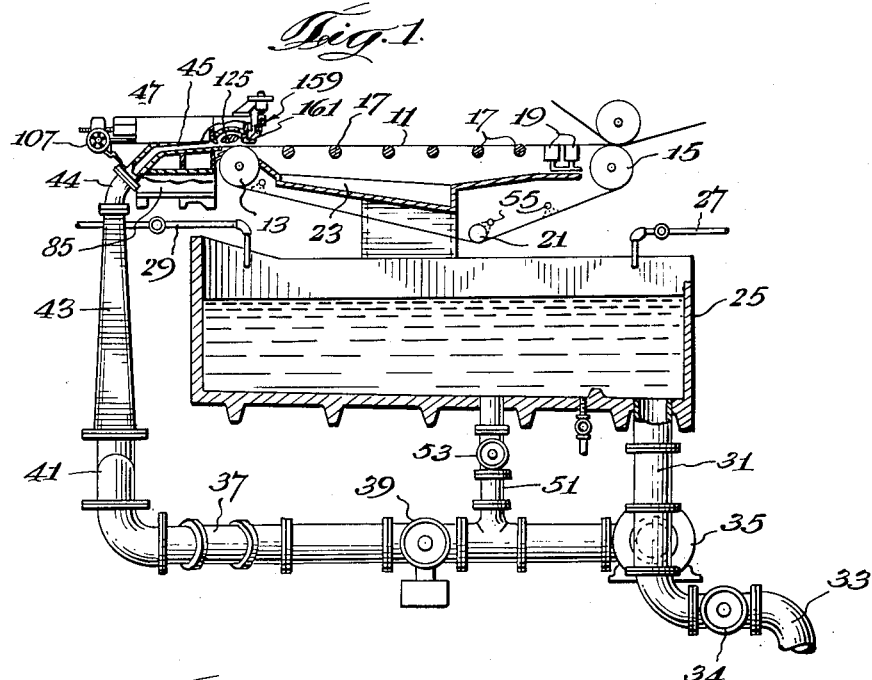
Figure 1 is a schematic view, partially in vertical section and partially in side elevation, of the wet end of a Fourdrinier, pressure inlet type papermaking machine embodying certain of the features of the invention and certain accessory equipment therefor.

The diagrammatic view, Figure 1, illustrates the general arrangement of a pressure-forming or inlet type Fourdrinier papermaking machine of the general character to which the present invention has particular application. As there shown, the Fourdrinier wire 11 is supported upon an open or suction type breast roll 13 and a couch roll 15, and is adapted to pass over a plurality of spaced table rolls 17 and suction boxes 19. The wire 11 is tensioned by additional guide or tensioning means, as illustrated at 21.

A tray 23, which is adapted to collect the white water, i. e. the liquid which drains through the wire during the web-forming operation, is disposed within the upper and lower reaches of the wire 11, as illustrated, and this tray is arranged to discharge into a mixing tank 25, which is normally maintained about three-fourths filled. Fresh water for make-up purposes may be added to the mixing tank 25 through the pipe 27, and additional stock as is necessary to maintain the proper consistency or fiber concentration of the fluid suspension or stock delivered to the web-forming region is added through a second inlet pipe 29.

The bottom of the mixing tank 25 is inclined, as shown, and a main flow line 31 connects to the tank at the lower end thereof. The main flow line 31 includes a branch extension 33 having a valve 34 therein for use in draining the mixing tank, and the main flow line 31 also connects with the inflow side of a stock or fan pump 35, which is the principal means relied upon to deliver stock to the web-forming region of the machine.

The outlet of the fan pump 35 is connected to the inlet structure of the machine by suitable piping, indicated generally at 37. Included in this piping is an automatically operable pressure regulating valve 39, a transition section 41, which converts the circular cross sectional stream delivered by the fan pump 35 and piping 37 to a stream of rectangular outline, and a flow spreader 43, which may, for example, be similar to the flow spreader disclosed in my prior application, Serial No. 119,140. The flow spreader 43 accomplishes the function of converting the uniformly dimensioned stream delivered by the transition section 41 into a relatively shallow stream of rectangular cross section, which desirably has a transverse width substantially equal to the cross-machine width of the web-forming region of the machine.

The outlet end of the flow spreader 43 is connected to the web-forming region of the machine by an angle connection 44 and a conduit 45, which is provided in the lower or stationary portion 49 of the flow control unit 47. The flow passageways within the angle connection 44 and the conduit 45 are each rectangular in cross-section and of the same dimensions as the outlet end of the flow spreader 43. The piping 37 also includes a by-pass line 51 which connects the outlet side of the fan pump 35, upstream of the pressure regulating valve 39, with the mixing tank 25, as shown. The by-pass line includes a shut-off valve 53. Suitable showers or sprays, indicated generally at 55, are provided for effecting continuous cleaning of the rolls and wire, in accordance with usual papermaking practices.

Figure 2:
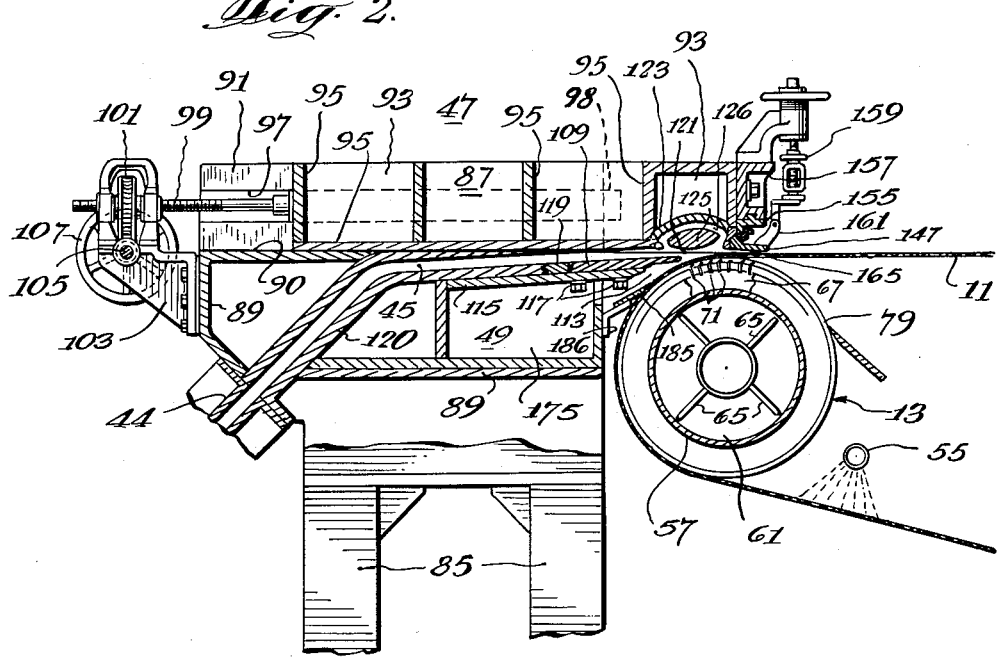
Figure 2 is an enlarged, vertical, cross-sectional view of the machine illustrated in Figure 1, this view showing certain of the details and features of the web-forming and flow control mechanism in accordance with the invention, which is embodied in that machine.

The particular breast roll constituting a part of the apparatus illustrated in Figures 1 and 2 is of the open-surfaced type and is illustrated in some detail in Figures 3, 5 and 6. As there shown, the roll 13 comprises a cylindrical shell 57 which may be of bronze or other corrosion resistant material and which is supported for rotation by means of a pair of shaft sections 59, each of which is mechanically connected to one end of the shell by a header unit 61. As shown in Figure 5, each of the header units 61 includes a plate section 63, the periphery of which is welded or otherwise attached to one end of the shell in water-tight relationship, together with a plurality of radially extending, symmetrically spaced bracing members 65.

At spaced intervals along the shell 57, the roll 13 is provided with a plurality of outwardly-projecting ring units 67 having a cross-sectional outline as illustrated in Figures 5 and 6. These rings 67 are integrally attached to the shell 57 and are provided with spaced notches 69 (Figure 3) which support a plurality of elongated bar or vane members 71. These vane members 71 are of generally curved cross section as shown particularly in Figure 3, and extend longitudinally of the roll surface with the longitudinal axes thereof substantially parallel to the axis of rotation of the roll.

The spaced vane members 71 are used to receive and to hold temporarily the liquid which is forced through the wire and the adjacent underlying surface of the roll during the web-forming operation. Each of the vanes 71, as shown particularly in Figure 3, includes a base or root portion which is rectangular in cross section, and which is adapted to fit within the vane-supporting slots 69 in the ring units 67. The slots 69 are so arranged that the root portion of each vane is disposed at an angle of about 15° to the radius which intersects the base of that portion. This angle is illustrated at $\alpha$ in Figure 3, wherein the radius is indicated by the line 73.

The remaining outer portion 75 of each of the vanes 71 is inclined forwardly, in the direction of roll movement, at an angle of about 120° with reference to the associated root section. The outer end portion 75 of each of the vane sections is tapered to a sharp edge with the result that each vane is, in effect, of curved cross-sectional outline. A radius drawn through the forward edge of the root section will substantially intersect the sharp edge of the outer portion 75, as shown in Figure 3. The outer edge portion 75 of each of the vane units 71 is notched, as shown particularly at 77 in Figures 5 and 6, and during the manufacture of the roll, an edgewise disposed ribbon 79 of bronze or other corrosion resistant material is wound into these slots 77 so as to provide a helical coil of closely spaced turns which extend along the periphery of the roll 13. This is shown particularly in Figures 5 and 6, and it will be noted that the helical ribbon 79 projects a substantial distance above the outer edges of the vanes. This arrangement permits free circulation of liquid between the cells or cavities formed in the roll periphery by the spaced vanes 71, and it also minimizes vane "shadows" in the formed web.

The roll constructions of the general type illustrated, the vanes 71 are preferably spaced within the range of from about ¾ to 1½ inches along the roll periphery, and the turns of the edgewise-wound wire ribbon 79 which defines the outer surface of the breast roll should be spaced sufficiently close together to prevent appreciable deformation of the forming wire during the operation of the machine. In a practical embodiment of the invention, where the breast roll had an overall diameter of approximately 24", the helical ribbon winding 79 was wound at a pitch of 5 turns to the inch, and constituted a strip of bronze ribbon having a thickness of .035 inch, and a maximum cross-sectional dimension of .250 inch. In this same construction, the edges of the vanes were about .15 inch below the outer peripheral edge of the ribbon.

As shown particularly in Figures 5 and 6, the vane support rings 81 at the two ends of the roll are of a somewhat greater height than the intermediate ring support members 67, and are adapted to co-act with locking rings 83 which engage notches in the end sections of the vanes, so as to lock the vanes in position. The particular arrangement of the vane elements 71 and the ribbon support 79 for the forming wire present a minimum of resistance to the flow of fluid through the wire into the breast roll. At the same time, the vanes are operable to retain the liquid which is received therein during the period in which the forming wire moves out of the web-forming region.

Referring to Figure 2, it will be seen that the flow control unit 47 includes the lower or stationary section 49, which is integrally attached to the main frame 85 of the machine, and an upper or adjustable section 87 which is supported on the stationary section 49. The lower section includes suitable plate and structural elements which define a frame portion, indicated generally at 89, having a flat upper surface 90, a pair of upwardly extending sides 91 and the walls of the closed conduit 45 through which stock is conducted to the other elements of the flow control means.

The upper section 87 of the flow control unit is likewise of fabricated construction and includes oppositely arranged side walls 93 which are integrally connected together by suitable, transversely-extending, structural members 95 to define a generally horizontally-disposed, box-structure which is supported upon the flat upper surface 90 of the frame portion 89 of the stationary section 49 so as to be movable toward and away from the vertical center line of the breast roll 13.

To facilitate the accomplishing of this movement, the side walls 91 of the stationary section 49 are provided with guideways 97 adapted to receive and to coact with suitable guide members 98 (Fig. 4) constituting an integral part of the side walls 93 of the adjustable section 87. The co-acting guides 98 and guideways 97 serve the additional function of preventing the hydraulic pressure which is developed within the flow passageways of the flow control unit 47 from displacing the adjustable section 87 relative to the lower, stationary section 49, and to aid in accomplishing this, it is generally desirable that these parts of the apparatus be constructed to fairly close tolerances. It may also be found desirable to include seals, as for example O-ring type seals, between the engaging surfaces of the upper and lower sections 87 and 49 to minimize the possibility of fluid leakage during operation of the apparatus.

Two or more horizontally extending adjusting screws 99 (Fig. 2) are affixed to the adjustable section 87 at spaced intervals therealong, and these screws engage internally threaded gear wheels 101, which are supported upon suitable brackets 103 attached to the frame portion 89 of the stationary section 49. The gear wheel units 101 are rotated simultaneously by worm gear sections keyed to a shaft 105 which is journalled on the brackets 103, and a hand wheel 107 or other means is provided for rotating the shaft 105. By this means, it is possible to move the entire adjustable section 87 of the flow control unit 47 toward or away from the vertical center line of the breast roll and thereby vary the dimensions of the web-forming region. The plane of separation between the upper and lower sections of the flow control unit 47 normally extends substantially parallel to the surface of the horizontal position of the forming wire 11.

It is also desirable that the breast roll 13 be supported in such manner that its position relative to the flow control unit 47 can be accurately adjusted in both the vertical direction and the horizontal direction. By this means (and the possible adjustment of the upper section 87 of the flow control unit), it is possible to effect very close control and adjustment of the dimensions of the web-forming region and of the flow passageways adjacent that region. Adjustment of the position of the breast roll 13 is most conveniently accomplished by the use of an automatically operable, adjustable roll support of a hydraulic or other type. Such mechanisms are commercially available, and hence, will not be described in detail.

The flow conduit 45, through which the stock is conducted from the discharge end of the angle connection 44 leading from the discharge end of the flow spreader 43, is rectangular in cross section and may have the same cross sectional area and dimensions as the discharge end of the flow spreader. In the illustrated structure, the lower defining surface of the flow conduit 45 in the region adjacent the web-forming region is defined by an apron plate 109 which extends transversely across the full width of the machine. The lower surface of the outer or lip portion 111 of the apron plate 109 is cut away, as shown, and desirably this surface is curved so as to provide with the adjacent surface of the wire 11, which is supported on the breast roll, a passageway 113 which is of increasing cross-sectional area in the direction opposite to the direction of movement of the wire. The apron plate 109 is supported upon an underlying support plate 115 (Fig. 2) by means of suitable screw fastenings 117.

In order that the position of the apron plate may be adjusted toward and away from the web-forming region and the breast roll, the structure includes a removable spacer bar 119, which is adapted to be interposed between the apron plate 109 and the plate member 120 (Fig. 2), which constitutes the main defining element for the lower surface of the flow delivery conduit 45. It will be apparent that by the use of spacer bars of varying width, it is possible to readily adjust the position of the apron plate 109 and particularly the relative spacing between the apron plate lip 111 and the forming wire. The outer edge of the plate 115 on which the apron plate is supported is also cut away in order to facilitate free backward flow of stock or other fluid during the web-forming operation.

The dimensions and the geometry of the flow passageways through the flow control unit 47 in and about the web-forming region constitute a particularly important feature of the present invention. As shown in Figures 2 and 3, the stream of stock which is delivered by the conduit 45 discharges into a flow control chamber or flow passageway 121, which overlies the web-forming region on the wire 11. The upper surface of the flow control chamber 121 is defined by a flow control vane 125, having a cross-sectional outline approximating that of a hydrofoil, and the sides of the flow control chamber 121 are defined by the two side plates 93. In order to facilitate division of the flow delivered to the web-forming region and to provide for recirculation of one of these divisions within the flow control unit during operation of the apparatus, the upstream and downstream ends of the flow control chamber 121 are connected by a curved passageway 126. The transverse walls of this passageway 126 are defined by the upper surface of the control vane 125 and the lower surface of a curved plate member 123, which extends between the two side plates 93 as shown particularly in Figure 3.

The circulatory flow produced within the passageway 126 above the flow control vane 125, is indicated generally by the arrows in Figure 3. The opposed, defining surfaces of the flow control chamber 121, which surfaces together with the underlying portion of the roll-supported forming wire 11 define the primary flow passageways within the flow control unit 47, are constructed so as to be substantially coincident with the defining surfaces of streamlines assumed to exist under flow conditions which can be expressed by the equations of potential flow.

In order to facilitate the operation of the apparatus and to extend the range of control that can be accomplished, the hydrofoil control vane 125 is supported for limited rotative movement about its upstream end. The support means includes a pair of stub shafts or pintles 127 which project through suitable bearings in the side plates 93, and which are engaged by adjusting and positioning means shown particularly in Figure 4. Essentially, the adjusting means consists of an adjusting arm 129, one end of which is adapted to engage a rectangular section 130, provided at the end of at least one of the stub shafts 127, and the other end of which is slotted and is arranged to be engaged by co-acting clamp nuts 131, supported upon a threaded member 133, as shown. In order to aid in securing even adjustment of the control vane 125 across the machine, it is desirable to provide a clamp adjusting means at each end of the vane. The apparatus may also include additional locking means for engaging and fixedly positioning the vane. For example, a locking screw may extend through one or both of the side elements 93 at either side of the machine in position to engage the forward portion of the vane. Such a screw is indicated at 135 in Figure 4.

An additional flow control means embodied in the apparatus of Figure 3 constitutes a second or auxiliary vane member 137 which is supported for limited rotative movement adjacent the upper edge of the stock delivery conduit 45. The vane 137 is likewise supported upon stub shaft sections 139, which are engaged by clamp type adjusting arms 141, similar to the arms 129. Also, similar to the arms 129, each of the adjusting arms 141 for the auxiliary vane 137 is adapted to be engaged by clamp adjusting nuts 142, supported upon a threaded rod 143 affixed to the adjacent side walls 93 of the unit. A position indicator may be associated with each set of adjusting arms, as shown at 144 and 146 in Figure 4.

The contour and dimensions of the flow passageways in the region where the formed web moves out of the flow control chamber 121 have been found to have a particularly important effect on the operation of the apparatus. To begin with, it is important that the defining surface of the flow passageway in the region where the flowing stream of stock within the flow control chamber 121 finally divides, one portion recirculating through the upper passageway 126 and the other portion moving in the general direction of movement of the wire, shall induce the minimum possible disturbance into the flow through the apparatus. Desirably, this surface should be so arranged that the flow reaching that surface will divide under substantially stable flow conditions, and as a result, will produce a line of stagnation points extending transversely across the machine. Moreover, this line of stagnation points should be located as close to the forming wire as is possible, and in any event, it should not be closer to the flow control vane 125 than the mid point of the flow passageway in that region.

In the particular apparatus illustrated in Figure 3, this line of stagnation points is realized by the provision of a generally cylindrical surface 145 at the downstream edge of the flow control chamber 121, the surface 145 being formed on the lower edge portion of a transversely extending member 149, which is one of the two support elements for the slice plate or discharge lip 147. The cylindrical surface 145 merges smoothly into the defining surfaces of the flow control chamber and the other flow passageways within the flow control unit, and it also merges smoothly into the adjacent surfaces of the exit lip or slice mechanism, which is disposed immediately downstream of the flow control chamber, 121.

In the operation of pressure forming apparatus in accordance with the invention, as in other pressure forming equipment, the progressive drainage through the web and the forming wire 11 within the web-forming region causes the stock consistency to increase at the downstream side of the web-forming region to such an extent that the web and the thin overlying layer of stock in the region where the web passes out of the web-forming region constitute essentially a plastic body. Thus, it is required that the web which has been formed on the wire in its passage through the flow control chamber 121 shall be, in effect, extruded out of that chamber, under conditions approximating the conditions of plastic flow, and to get the formed web from the flow control chamber out into the atmosphere without disturbance or scuffing requires further careful control of the flow passageways in this region of the machine. In certain particularly satisfactory embodiments of the invention used in the manufacture of paper, the use in this region of a flat, inclined surface, arranged to overlie the adjacent surface of the forming wire and to define with that surface a flow passageway of substantial length and of constantly decreasing cross-sectional area, has been found to be especially advantageous.

In the particular apparatus shown in Figures 2 and 3, this surface is provided by means of the hingedly supported discharge lip or slice plate 147, which extends transversely across the machine. The discharge lip 147 is supported upon the frame of the upper section 87 of the flow control unit by the co-acting support elements 149 and 151, which are provided with cylindrical bearing portions arranged to engage a pintle 153 formed on the upstream section of the lip plate. The support elements 149 and 151 are affixed to a transverse angle member 155, which, in turn, is engaged and supported by a transversely-extending beam member 157 bolted to the edge of the upper frame section, as shown particularly in Figure 2.

The transverse beam 157 also serves to support a plurality of screw adjustment units 159 (Figure 2) which are operatively connected to the discharge lip 147 at spaced intervals across the width of the machine by suitable arm and hinge connections 161. As previously stated, the lower surface of the support member 149 merges smoothly into the lower surface 163 of the discharge lip 147, and with that surface, defines the upper surface of the decreasing area passageway 165 through which the formed web is moved from the flow control chamber 121.

In papermaking operations involving the manufacture of tissue and book papers from stock having a consistency within the range of from about .05 to 1.0%, at speeds from 500 to 3000 feet per minute, the angle between the surface 163 and the adjacent, underlying wire surface, which angle defines the rate at which the cross-sectional area of the passageway 165 decreases, may vary within moderately wide limits. In general, however, it appears that the best results in the manufacture of paper under the stated conditions will be obtained when this angle is within the range of from about 3° to 5°. When the apparatus is used for the manufacture of tissue and book papers from stock having a consistency within the stated range, the passageway 165 should have a length in the direction of wire movement of at least 10 times its depth at the inflow end, in order to assure the discharge of the formed web under conditions approaching the conditions of plastic flow. In connection with the operation of apparatus as defined above, it is important to note that the slice mechanism and its flow passageway 165 accomplish the most important function of acting as a transition means for reducing, without disturbing the web, the pressure in the formed web from the relatively high pressure existing within the flow control chamber 121 to atmospheric pressure at the exit end of the slice mechanism.

In order to confine the flowing stream of stock which is delivered to the flow control chamber 121, and via that chamber to the web-forming region of the machine, the apparatus includes at each side thereof a series of three edge seals arranged to engage the forming wire 11 in the region of web-formation. All three of these seals are shown in side elevation in Figure 4, and the individual seals are shown in cross section in Figures 6, 7 and 8. The seal shown in Figures 4 and 6, which is illustrative of the seals associated with the side walls 93 of the upper section 87 of the flow control unit 47, includes a generally L-shaped, resilient sealing strip 167 of rubber or like material, which is adapted to be received within a suitable undercut portion of each of the side wall plate sections 93. The sealing strips 167 are held in position and are forced into sealing engagement with the wire 11 by means of suitable pressure strips 169 and adjusting screws 171, as shown. As shown in Figure 8, a similar sealing strip 173 is positioned within a like recess in each of the plate members 175 defining the sides of the stationary section 49 of the flow control unit, and the sealing strips 173 are also pressed into engagement with the wire by pressure strips 177 which are engaged by adjusting screws 178.

The edge seal means used in conjunction with the adjustable discharge lip 147 are of a somewhat similar construction in that each utilizes a sealing strip 179 which is manufactured of sponge rubber or other suitable resilient sealing material. Each of the edge strips 179 is arranged to be compressed, and thereby forced into engagement with the adjacent wire 119, by suitable pressure members 181, which are L-shaped in cross section and are held in position by screw fastenings 183. The several sealing strips may include a bearing portion of solid flexible rubber, as illustrated at 184.

During the operation of apparatus as illustrated in Figures 1 through 6, stock is delivered at uniform pressure and at a substantially uniform flow rate to the conduit 45 leading into the flow control chamber 121 by action of the fan pump 35. The conduit 45 discharges stock into the flow control chamber 121 as a flowing stream, having its axis of flow generally tangent to the surface of the forming wire within the web-forming region, and the flow control chamber 121 delivers the flowing stream of stock to the web-forming region under such conditions of pressure and velocity that the web is formed at the highest possible speed with a minimum or a predetermined, controllable directional effect and with a minimum of fiber penetration of the forming wire.

More particularly, the flowing stream of stock is delivered to the web-forming region under conditions of curvilinear flow which are so controlled that the pressure differential across the web-forming member within the web-forming region increases in the direction of movement of that member. At the same time, the velocity of the stock reaching the web-forming member is maintained as nearly equal to the velocity of that member as is possible, and in any event, it is maitained substantially equal to the velocity of the web-forming member in the upstream portion of the web-forming region. The pressure differential is attained in the disclosed embodiments of the invention by providing a curvilinear flow path adjacent the web-forming region which is also of expanding cross-sectional area, the rate of expansion being adjusted to attain the desired pressure differential.

The use of an expanding flow path of controlled dimensions also aids in maintaining the velocity of flow within the web-forming region as nearly equal to the velocity of the wire as is possible. The combined result of these various provisions is a flow control means, wherein the fiber suspension reaching the upstream portion of the web-forming member is at a velocity which is substantially equal to the velocity of that member, and which is under a minimum pressure consistent with the obtaining of good web formation. In the succeeding portions of the web-forming region, the pressure is caused to increase progressively in the direction of movement of the forming member, and the velocity is maintained as nearly equal to the velocity of the forming member as is possible.

As previously pointed out, the invention also contemplates the division of the flowing stream of stock which is delivered to the web-forming region into at least three main parts, one of which is caused to flow backwardly along the wire or other forming member as that member moves into the web-forming region, a second part which is caused to flow through the wire to form thereon the web, and a third part, which is conveyed away from the web-forming region and which may be recirculated. Further, by proper design of the several flow passageways, and particularly the use of solid boundaries which approximate streamlines assumed to exist under conditions of potential flow, the fluid suspension of fibers is delivered to the web-forming region under flow conditions which approximate the conditions of potential flow.

These general principles of operation are disclosed in my prior application, Serial No. 196,893. In the structures disclosed in that application, however, the attainment of the desired control of the pressure and velocity relationships within the web-forming region is accomplished in the main by the use of mechanism which adds controlled amounts of mechanical energy to the stream of fluid which is delivered to the web-forming region. In accordance with the present invention, control of the velocity and pressure relationships is obtained by the use of specially designed flow control passageways in the region of the web-forming member, of which the structure shown in Figures 3 to 6 constitutes an illustrative example.

In that structure, the first of the above-described main divisions of the flowing stream of stock which is delivered to the web-forming region, which division flows backwardly along the wire as that member moves into the web-forming region, emerges from the flow control chamber 121 through the passageway 113 existing between the under-surface of the lip 111 of the apron plate 109 and the adjacent surface of the wire 11. This backwardly flowing stream of stock is maintained in such amount that a condition of stable flow will be attained at the discharge end of the stock delivery passageway 45, and transient instabilities resulting from flow disturbances adjacent the upstream or inflow end of the web-forming region will be substantially eliminated. This backwardly flowing stream of stock has the further effect, as previously described, of continuously removing and carrying away from the web-forming region the lower boundary layer of the flowing stream of stock which is delivered to the flow control chamber 121. This is also of considerable value in attaining conditions of flow within the flow control chamber which approximate the conditions of potential flow.

It will be understood that the term "potential flow" as used herein is intended to have the same meaning and the same connotation as in accepted hydrodynamic theory. That is to say that the conditions of potential flow exist within a flowing stream when the flow throughout that stream is irrotational or reversible. Thus, under the conditions of potential flow, there are no major energy losses (such as eddies) occurring anywhere in the stream, and from that fact, it follows that under the conditions of potential flow, equations must exist for both the flow and the pressure potential. As previously indicated, it is not possible, under practical conditions, to attain flow conditions exactly conforming to potential flow theory, but it is possible to approach those conditions.

The mathematical analysis of potential flow conditions in both the general and the various special solutions involves the use and solution of differential equations, which may be quite complex in nature. As exhaustive exposition of the theory and a number of illustrative solutions will be found in the treatise "Hydrodynamics" by Sir Horace Lamb, Cambridge University Press, 1932, pp. 37, 38 et seq.

In the Figure 3 structure, the geometry of the flow passageway through which stock is delivered to the web-forming region on the wire 11 is determined primarily by the hydrofoil vane member 125. This vane is of such form that the flow control chamber 121 constitutes a flow passageway of increasing effective cross-sectional area in the direction of wire movement, and of generally curvilinear shape. The adjustable support for the hydrofoil vane 125 makes possible a substantial degree of control over the pressure and velocity conditions obtained, and some additional control is also attained by means of the adjustable auxiliary vane 137. In connection with the design of the apparatus, it is important, as previously pointed out, that the surfaces of the hydrofoil vane 125, the coacting defining walls of the flow control chamber 121 and the auxiliary vane 137 shall be so formed that the fluid suspension of fibers which moves through the flow control unit 47 is delivered to the web-forming region under conditions which approximate, as nearly as possible, the conditions of potential flow. This requires that the defining surfaces, in cross section, shall approximate streamlines, assumed to exist under conditions of potential flow, and, while, in the actual apparatus, there will be necessarily some departure from the exact conditions of potential flow, this departure can be maintained at a sufficiently low value to make possible important improvement in the operating characteristics of the web-forming mechanism.

The third main division of the stock involves the continuous removal from the web-forming region of at least the upper boundary layer of the flowing stream which is delivered to the flow control chamber 121. This removal may be accomplished in various ways. In the structure of Figure 3, the third division of the stock, which includes the upper boundary layer, is recirculated within the flow control unit via the flow passageway 126, this arrangement having certain advantages in facilitating the control of flow within the flow control unit and the attaining of the desired pressure and velocity relationships. As an alternative arrangement, this third division of the stock flow may be conducted away from the flow control unit and returned to a convenient point in the white water or stock supply system.

The curves $P_1$ and $P_2$ of Figure 9 illustrate pressure relationships of the type obtained during the operation of a flow control unit in accordance with the invention, similar to the unit illustrated in Figure 3. The curve A of Figure 10 illustrates the volume of the flow path through which the stock or other fibrous suspension is delivered to the web-forming region.

The curves of both figures are keyed to the flow control chamber 121 and the other flow passageways in and about the web-forming region of the flow control unit 47 by the circled numerals 1 to 8 and the letters A through F, inclusive. For example, the curve $P_1$ and the curve A at the point labeled 3 indicate, respectively, the pressure and the relative volume of the flow path at that region of the flow control chamber 121 during normal operation of the apparatus.

As will hereinafter appear in some detail, the attainment of the objects of the invention requires the operation of the web-forming equipment, when used in the manufacture of any given product, to be carried on under certain definite and critical pressure relationships and structural arrangements and dimensions.

In the use of apparatus of the type illustrated in Figure 3, fine adjustment of the recirculation of stock about the main control vane 125, with its resulting accompanying removal of the upper boundary layer, is most conveniently controlled by adjusting the auxiliary vane 137. Generally, this adjustment should maintain a pressure in the region 2 which is less than the pressure existing at the region F, and this differential of pressure, together with the differential which is maintained at the entrance to the upper passageway 126 within the flow control unit, i. e. in the region A, assures the recirculation of adequate amounts of stock during the operation of the apparatus. Under these conditions, as shown in the curve $P_1$, the first fibers to reach the wire are under minimum hydraulic pressure. At the same time, by appropriate adjustment of the pressure at which the stock is delivered to the unit or of the vane 125, these fibers are maintained at a velocity which is approximately equal to, and in the same direction as, the velocity of the moving wire. Thus, in the initial portion of the web-forming region, the portion indicated at 3 in Figure 3, the flow velocity will substantially equal the wire speed and the hydraulic pressure in the flowing stream of stock delivered to the web-forming region will be at a minimum.

The maintenance of the above-stated conditions effects the laying down of the initial part of the web with a minimum of penetration of the wire, and with a minimum or controlled directional effect, due to the absence of relative movement of the wire and fibers, or due to the control of this relationship, as formation begins. As the mat is established, however, the hydraulic pressure within the flow control chamber 121 (and the pressure differential across the wire) is caused to increase quite rapidly with minimum possible change in the velocity or direction of flow, this being accomplished by the relative proportioning of the flow passageway 121 within the flow control unit, and being illustrated by the portion of the curve $P_1$, labeled 4 and 5. The increased pressure and the increased pressure differential which results therefrom make possible rapid and effective drainage of the carrier fluid through the web (despite the fact that the web is increasing rapidly in thickness), and the maintenance of substantially uniform velocity assures optimum formation. At the same time, both the upper and the lower boundary layers of the flowing stream of stock delivered to the web-forming region are being conducted away continuously from that region, and this accomplishes further improvement in the flow conditions within the flow control unit.

It is important that the apparatus provide for the maintaining of adequate volumes of flow in both the backwardly flowing stream of stock which emerges from the flow control chamber and flows backwardly along the forming wire, and in the stream which is recirculated within the unit or otherwise conducted away from the web-forming region at the downstream end of that region. However, in both instances, it is the character of the flow (i. e. flow under stable flow conditions) and not the amount that is of primary importance.

In papermaking equipment, the design should be such that up to about 50% of the total flow of stock or other fiber-bearing fluid delivered to the web-forming region can be directed into the backwardly flowing stream of stock. Usual values in the operation of equipment used in the manufacture of tissue and book paper from stock having a consistency within the range of from .05 to 1.0%, at speeds from 500 to 3000 feet per minute, may be within the range of from about 15–20%. Under similar conditions, the percentage of the total flow of stock going into the web-forming region which is recirculated within the flow control unit or otherwise conducted away from the downstream end of the web-forming region, may be within the range of 25–35%.

For the purposes of this application, the web-forming region may be defined as that region wherein the concentration and deposition of those fibers which ultimately constitute the formed web is actually taking place. Alternatively, the web-forming region may be defined as that region within which there is substantial flow through the web-forming member. Under ordinary operating conditions, there will be substantial fiber deposition and flow through the wire in the illustrated apparatus in at least part of the region beneath the slice plate 147. There will also be substantial fiber deposition and flow through the wire in the region included within radial lines drawn from the center of the breast roll tangent to the edge surface of the lip 111 of the apron plate 109 and to the surface 145 at the downstream edge of the flow control chamber 121, and there may be, and frequently is, some deposition of fiber onto the web wire from the backwardly flowing stream of stock which is discharged from the flow control chamber 121 via the passageway 113.

The conditions of flow existing within the flowing stream of stock which emerges from the flow control chamber and flows backwardly along the forming wire are such that the stream is discharged substantially as a jet. Minimum disturbance of the jet and improved operation will generally result if the apparatus is provided with a shield or deflector of the general type illustrated at 185 in Figures 3 and 4. This shield constitutes an inclined plate which extends transversely across the machine between the plate members 175 which define the sides of the stationary section 49 of the flow control unit. The outer end of the shield 185 is tapered so as to extend into close proximity to the wire 11, and since the position of the breast roll is adjustable, it is desirable that the shield be adjustably supported, as by the spaced brackets indicated at 186 in Figure 2.

In operation, the shield or deflector 185 prevents the backwardly flowing stream of stock from contacting the roll surface except in the region immediately beneath the apron plate lip 111. It also prevents, or at least minimizes, disturbance of the stream by air which might be pumped by the rotating roll. The fluid which is discharged backwardly along the ascending wire on top of the shield or deflector 185 may be carried away through openings between the lower edge of the shield and the frame 89 of the stationary unit, or otherwise, as is convenient.

During the practice of the invention, the attainment of flow conditions which are substantially defined by the potential flow theory involves the existence of flow conditions within the flow control chamber wherein the Reynolds number is above about 5000 and the existence of fine-grain or fine-scale turbulence within the flowing stream of fluid which is delivered to the web-forming region on the wire. This is an important aspect of the invention, since it assures the presence within the flowing stream of fiber-bearing fluid reaching the web-forming region of a very large number of small vortices of about the same dimensions as the individually suspended fibers with resultant improvement in the fiber distribution and the web formation.

A variable of considerable importance in the operation of apparatus of the present type is the length of the web-forming region along the wire or other forming member. In apparatus of the illustrated type, this length can be varied by adjustment in a fore-and-aft direction of the upper section 87 of the flow control unit 47, this being accomplished by operation of the interconnected adjusting screws 99. It is also possible to effect adjustment of the dimensions of the web-forming region by change in the length and shape of the apron plate 109 and its lip 111. The adjustable support for the breast roll is of considerable importance in assuring proper positioning of the wire when adjustment of the length of the web-forming region is to be made.

This possibility of varying the length of the web-forming region on the wire, together with the control of the recirculation within the flow control chamber 121, which is made possible by the adjustable mountings for the main control hydrofoil vane 125 and the auxiliary vane 137, permits satisfactory operation of the equipment over a comparatively wide range of machine operating speeds, and over a comparatively wide range of fiber concentrations or stock consistencies.

The fore-and-aft adjustment of the flow control unit also makes possible considerable variation in the position of the web-forming region relative to the breast roll or other support for the forming member. In the structure illustrated in Figure 3, the web-forming region includes at any particular instant, a section of the wire which is entirely supported on the breast roll and a section which is unsupported on the breast roll.

As a result of this arrangement, a substantial percentage of the water which drains through the wire during the web-forming operation passes through that member without flowing into the open-surfaced breast roll. This is the preferred method of operating web-forming apparatus in accordance with the invention. However, it is also possible to so position the flow control unit relative to the breast roll that the wire is in contact with the breast roll and is supported thereon throughout the web-forming region; and when this condition exists, substantially all of the water which drains through the web-forming member must pass into the roll surface.

In the practice of the present invention, use of a fluid permeable support such as an open breast roll at the upstream portion of the web-forming region will be found of considerable assistance in attaining pressure and velocity relationships in accordance with the invention in the upstream portion of the web-forming region. The use of an unsupported section of the wire in the downstream portion of the web-forming region similarly facilitates the obtaining of the desired pressure and velocity relationships in the downstream portion of the web-forming area, and also considerably facilitates the problem of disposing of the fluid which flows through the forming member.

As previously indicated, the relative dimensions of the supported and unsupported sections of wire within the forming region can be varied by fore-and-aft movement of the web-forming region alone or in combination with movement of the breast roll. In general, it will be found that the most efficient operation will be obtained when the flow through the unsupported section of the wire is at least 20% of the total flow in the web-forming region, and the amount of flow through the unsupported section of the wire may be increased substantially over this figure when the operating conditions so indicate.

In the use of the invention in the manufacture of paper, the length of the web-forming region along the wire is determined primarily by the basis weight of the paper which is being made, and to a somewhat lesser extent by the freeness of the stock being used. In the manufacture on a Fourdrinier papermaking machine of the pressure inlet type, provided with flow control means in accordance with the invention, which machine is being operated at speeds in the range of from 1000 to 3000 feet per minute, of tissue having a basis weight of not more than about 15 lbs. per standard ream of 480 sheets 24 by 36 inches, by the use of the usual types of stock at a consistency within the range of from .05 to 1.0%, the web-forming region should have a length within the range of from approximately 2 to 7½ inches.

At the same time, the pressure differential provided across the web-forming member at the upstream end of the web-forming region should not be less than about 5 inches of water and not less than about 20 inches of water at the downstream end of the web-forming region. The pressure differential across the web-forming member may increase from an initial value of not less than about 5 inches of water to a maximum of about 90 inches of water, and the minimum difference in the pressure differentials at the upstream and downstream ends of the web-forming region should be not less than about 15 inches of water, as above indicated.

To illustrate, the optimum values for a forming length of two inches, in equipment being used in the manufacture of paper having a basis weight of from about 4 to 10 lbs. per standard ream, under the above-stated conditions, may involve pressure differentials across the forming member which increase from approximately 20 inches of water at the upstream end of the web-forming region to approximately 80 inches of water at the downstream end of the web-forming region. Desirably, the pressure and pressure differential increase uniformly along the web-forming region in the direction of wire movement.

In the manufacture of tissue having a basis weight within the range of from about 4 to 10 lbs. per standard ream, on a pressure inlet type Fourdrinier machine, at speeds of from 1000 to 3000 feet per minute, by the use of stock having a consistency within the ranges above stated, the optimum length of the web-forming region is from about 4½ to 5 inches, and the optimum range of pressure differentials is from approximately 10 to 50 inches of water.

Because of the need for careful control of the geometry of the flow control chamber 121, and the various flow passageways in and adjacent to the web-forming region, apparatus in accordance with the invention is particularly adapted for use in conjunction with breast rolls of the open-surfaced type. This type of breast roll permits the forming member to be rigidly supported within a portion or even all of the web-forming region, and hence, is of considerable assistance in maintaining accurately the geometry of the flow passageway. The use of open type breast rolls has the further advantage in that such rolls can be provided with suction boxes. This makes possible additional control of the flow, of the removal of fluid from the web-forming region, and of the pressure relationships, and especially the pressure gradients, at the web-forming region. The use of suction boxes may extend substantially the range of operating conditions over which satisfactory operation of the apparatus can be effected.

It should be understood, however, that it is possible to employ flow control means in accordance with the invention in conjunction with open and suction breast roll types other than those illustrated herein. For example, open breast rolls of the so-called "drilled-shell" type can be used with good results. These rolls utilize a relatively thin-walled, cylindrically-shaped, outer shell which is drilled to provide a large number of flow passageways into the interior of the shell. Usually the open area in the shell surface exceeds the closed area and the individual openings are usually counter-sunk to improve the flow characteristics and to decrease the area of contact between the roll surface and the forming wire. This type of roll may be used with or without suction boxes.

It will also be understood that wire support mechanisms other than open or suction type breast rolls can be utilized. For example, traveling suction boxes, table rolls, open-surfaced suction boxes and the like may be employed, and it is also possible to utilize the principles of the invention in apparatus employing a forming member which is entirely unsupported in the forming region.

The approximate dimensions, the relative proportions and the surface outlines of the stock delivery mechanism, including the stock inflow passageway, the flow control chamber and the surfaces of the hydrofoil and auxiliary vane members, can be ascertained in conjunction with any particular installation by application of the potential flow theory, and depending upon the refinement to which the calculations are carried, it is possible to produce a flow control unit which is capable of effecting the desired control of the pressure and velocity relationships within the web-forming region, over a fairly substantial range of wire speeds and stock consistencies. When the apparatus is put into operation, however, it will generally be found desirable to effect on-the-machine adjustment of each of the flow control vanes, of the position of the slice and apron plate, of the length of the web-forming region, and possibly some adjustment of the position of the breast roll itself. These various adjustments are capable of being made fairly readily by observation during operation, aided by the use of pressure taps provided within the flow control chamber.

One factor which also facilitates the adjustment of the apparatus is the observed capability of apparatus in accordance with the invention to form a web of fibers on a web-forming member as for example, a web of papermaking fibers on a wire, by the use of stock having very low consistency. To illustrate, tissue paper of the usual weights in everyday use are commercially manufactured on Fourdrinier papermaking machines from stock having a consistency within the range of from about .18% to .35%, and book papers of the usual weights are manufactured from stock having a consistency within the range of from about .5% to 1.0%.

In apparatus in accordance with the invention, stock consistencies as low as .05% can be used in making tissue and book papers on Fourdrinier machines at speeds within the range of from about 1000 to 3000 feet per minute, and the usual consistencies employed will be within the range of from .05 to .4%, with a preferred range for the manufacture of tissue of .08 to .12%. This permissive use of low consistency stock appears to be a direct result of the positive control of the pressure and velocity relationships, which are attained within the web-forming region by the use of apparatus in accordance with the invention.

Also, apparently because of this control, and especially the increasing pressure gradient within the web-forming region in the direction of movement of the web-forming member, it has been observed that apparatus in accordance with the invention is operable to form a web with a much higher percentage retention of fiber than is the case in the use of previously known apparatus. In fact, in a properly designed mechanism in accordance with the invention, it is possible to obtain fiber retention on the forming member of as high as 90%, when operating at consistencies in the lower portion of the above-stated range. This is a matter of considerable importance when it is realized that the retention in the prior structures may be as low as 45% with much higher consistency values. The net result is that paper of a given weight can be manufactured at higher speeds and at lower percentage consistencies—with the improved formation resulting from the use of lower consistencies—without substantial increase in the total quantity of stock which must be pumped through the web-forming mechanism. This is a most important feature of the invention in the manufacture of certain types of paper.

When flow control apparatus of the type illustrated in Figures 2, 3 and 6 is to be placed into operation, the positioning of the flow control unit 47 which determines the location and dimensions of the web-forming region, and the positioning of the main control vane 125, the auxiliary vane 137, the discharge lip 147 and the apron lip 111 will usually be based upon the approximate calculated position for those elements. Generally, the first adjustment to be made will be of the auxiliary vane 137 to assure the attainment of satisfactory recirculation within the flow control chamber. As previously stated, this vane accomplishes the primary function of creating a region of reduced pressure extending transversely of the machine along the region indicated at F in the cross sectional view of Figure 3. By the use of pressure taps, either in the side walls 93 of the flow control unit, as indicated at 187 in Figure 3, or in other of the defining surfaces of the flow control chamber 121, as indicated generally at 189, it becomes possible to ascertain immediately following the admission of stock to the flow control unit whether or not the pressure differential between the regions indicated at 2 and at F in Figure 3 is adequate to accomplish the desired recirculation.

It will be evident that other means of measuring this flow are possible, and are very practical. For example, there are available electrical flow measuring mechanisms which employ a heated search unit. These units may be introduced into contact with a flowing stream of fluid, and since the cooling effect will vary with increased rates of flow, the units may be calibrated to read flow directly in any stated unit.

Regardless of the mechanism employed, once the recirculation has been established at or about the rate which theoretical calculations or prior experience indicates as proper, the next normal adjustment will be of the position of the lip 111 of the apron plate 109, which adjustment determines the amount of stock which flows backwardly along the moving forming wire as that wire moves into and through the web-forming region. The desired effect is, as previously stated, the creation of a stable flowing stream of stock backwardly along the wire, and when this condition is reached, there will be a substantial elimination of transient instability within the flow control chamber, and at the same time, there will be a removing from the web-forming region of the boundary layer of the stream of stock which flows into the flow control unit 47 and through that unit to the web-forming region on the forming wire 11. As previously pointed out, the amount of stock which is discharged in the backward direction through the passageway 113 will normally constitute a substantial proportion of the total stock delivered to the flow control unit, and may, as shown in my said application, Serial No. 121,525, amount to 40 or even 50% of the total flow into the flow control unit. However, it is the stable character of the flow, rather than the amount, which is the critical factor in obtaining satisfactory operating conditions.

The optimum location of the lip 111 of the apron plate 109 is very easily ascertained by a trial and error procedure. This follows because of the fact that the existence of stable flow conditions in the backwardly flowing stream is accompanied by corresponding stable flow conditions in the adjacent portions of the stock flow conduit 45. Thus, a pressure tap, or a series of transversely-spaced pressure traps, may be provided in this region, as for example as shown at 191 in Figure 3, and the optimum location of the lip can be determined by reference to the pressure conditions existing in this region, the correct setting of the lip being shown by the elimination of substantial pressure variations in the region to which the pressure tap connects. Pressure taps in the side walls 93, as indicated at 193, may also be used for this purpose. Following adjustment of the apron lip 111, some further adjustment of the auxiliary vane 137 may be indicated. Usually, however, this is small.

The next adjustment is usually that of the discharge lip or slice plate. This is a visual operation and normally the only adjustment required is that of providing a sufficient gap at the discharge end of the passageway 165 to assure the outward flow of a very thin layer of stock immediately above the formed web, which is at a speed sufficient to accomplish a lubricating function during the discharge of the web from beneath the slice plate. The relative fore-and-aft position of the flow control unit determines the amount of flow through the unsupported section of the wire.

The exact velocity of flow of the layer which is discharged with the web is very difficult to determine, due to the fact that considerable shear is present in the decreasing area passageway 165 and at the slice lip, with the result that the portion of the layer of stock adjacent the slice surface has approximately a zero velocity, whereas the portion or lamina directly overlying the web is at wire velocity. In general, however, it is believed correct to state that the layer of stock is discharged under such conditions that the average velocity approximates the speed of the wire.

While it is important that the pressure differential across the wire shall increase in the direction of movement of the wire, it is also necessary to effect removal of the formed web from the flow control mechanism under such conditions that the web will not be disturbed or disarranged. This means that the exit passageway from the flow control chamber shall accomplish a smooth and even decrease in the hydraulic pressure which exists on the upper surface of the wire and on the formed web, as illustrated by the curve $P_1$ in Figure 9. Here again, if desired, pressure taps may be provided, as indicated at 195 in Figure 3, and substantial assistance in the correct location of the slice plate can be had by reference to these taps. Inspection of the formed web will be, however, in most instances the primary consideration in the determination of the correct position of the discharge lip.

Inspection of the formed web will also be relied upon to a considerable degree for determining the optimum position of the main flow control vane 125. Due to mechanical considerations, it is quite difficult to provide any considerable number of pressure taps or of velocity indicating mechanism along the defining surface of the main flow control vane 125, and accordingly, the most convenient index of the proper position of this vane will be the quality and character of the formed web. Since the most even formation of the web will be attained when the pressure and velocity conditions within the web-forming region most nearly approximate those conditions heretofore set forth as the objective of the invention, i. e. uniform velocity equaling the velocity of the web-forming member in the web-forming region, accompanied by rapid, progressive increase in the hydraulic pressure in the direction of movement of the web-forming member, the use of visual inspection of the web is a practical and convenient mode of adjustment.

As previously stated, the initial position of the main flow control vane 125 may be fixed by theoretical analysis of the design, and it will generally be found that only a comparatively small, subsequent adjustment will be required. The main control vane 125 has, however, a very marked effect on the formation of the web which is being laid-down in the web-forming region. In fact, it is possible by adjustment of the main flow control vane, to so disturb the pressure and velocity relationships existing within the web-forming region that substantially no fiber will be deposited on the web-forming member for substantial periods of operation.

The slice mechanism used in conjunction with the invention accomplishes, as previously stated, the important function of conducting the formed web out of the web-forming region, without disturbing or disarranging the web fibers. This involves the accomplishment of a transition action during which the pressure in the formed web is reduced from the pressure existing in the web-forming region within the flow control mechanism to atmospheric pressure. In the construction illustrated in Figures 3, 5 and 6, the slice mechanism includes a hingedly-supported slice plate 147, which defines with the adjacent, underlying surface of the wire 11, a more or less wedge-shaped passageway 165 which is of decreasing cross-sectional area and of substantial length in the direction of web movement. The hinged slice plate 147 is adjustable, within certain restricted limits, by operation of the adjusting means 159 and this construction will be found to accomplish its intended function in a quite satisfactory manner in the manufacture of a number of different types and kinds of paper.

Other slice or discharge lip constructions, however, have particular advantage in certain instances, and one arrangement of this character is illustrated in section in the fragmentary view, Figure 11. This structure, except for the slice mechanism and the adjacent end portion of the flow control unit 87, may be exactly similar to the structure illustrated in Figures 3, 5 and 6, and the corresponding structural elements bear the same reference characters.

The slice structure illustrated in Figure 11 includes a transversely-extending beam member 196, which is similar to the beam 157, and this beam member is bolted or otherwise rigidly attached to a transversely-extending plate member 95a, which constitutes the end portion of the frame structure of the upper section 87 of the flow control unit. Also affixed to the transversely-extending frame member 95a is a second transversely-extending structural element 197, which serves as the main support for an adjustable slice plate 199.

The structural elements 95a and 197 are machined to provide a flat support surface for the slice plate 199, which surface extends transversely across the machine at an angle of approximately 45° to the horizontal. The slice plate 199 is adapted to be held against this surface by means of suitable screw fastenings 201 and a coacting guide plate 203. The screw fastenings 201 extend through enlarged openings 204 in the slice plate 199, and spaced adjusting screws 205 are provided transversely across the machine, in order that the slice plate can be moved relative to its support means. The adjusting screws 205 bear against a transversely-extending member 207, which engages the beam 196 through a slot and key connection and which is bolted directly to the member 197.

The edge surface 209 of the slice plate 199 which is initially contacted by the flowing stream of stock within the flow control unit is curved and may be cylindrical in form. This is done in order that the flow within the flow control chamber 121 will divide in the region of this edge surface, so as to provide a line of stagnation points which extend transversely across the machine in accordance with the operational principles of the invention. During normal operation, this line of stagnation points will be substantially at the mid point of the surface 209 and, hence, will be nearer the forming wire than the adjacent surface of the flow control vane 125.

The contour and dimensions of the slice surface 211 which overlies the forming wire 11 in the region downstream of the arcuate edge surface 209 have, as in the previously described structure, an important effect on the operation of the apparatus. In order that the forming web may be carried out of the web-forming region under conditions approximating the conditions of plastic flow, and with a minimum of scuffing or other damage to the web, this surface 211 preferably comprises a flat, inclined surface which extends toward the adjacent surface of the forming wire and which defines with that surface a flow passageway 213 of substantial length and of constantly decreasing cross-sectional area. The lip of the slice plate 199 is defined in the illustrated structure by a vertically-extending edge surface 215, which merges into the inclined surface 211 as shown in Figure 11.

When a slice structure of this type is to be used in the manufacture of paper of tissue and book weights, by the use of the usual types of stock at consistencies and at speeds within the range set forth above, it will generally be found desirable to so position the slice plate 199 that the passageway 213 will have a width or height at the entrance end thereof of from about 1/10 to 1/5 of an inch. The length of the passageway 213 under most operating conditions should be at least ten times the inlet width, and the angle between the slice surface 211 and the underlying surface of the forming wire will normally be within the range of from 3° to 5°.

In order that the slice plate 199 may be adjusted in a vertical direction, the construction includes one or more spacer plates 217, and it will be evident that any reasonable vertical adjustment of the slice plate can be attained by the use of a suitably dimensioned spacer plate or plates. Other adjustment is, of course, possible, by movement of the breast roll itself.

The upper surface 219 of the slice plate 199 and the exposed surface 221 of the spacer plate or plates 217 merge smoothly into each other and into the adjacent defining surfaces of the flow control unit, as illustrated. The structure includes edge seals 167 and 173, as in the previously described structure. The breast roll 13a may be similar to the breast roll 13 of the previously described structure. Alternatively, it may be similar to the breast roll 231 illustrated in Figures 12 and 13, and hereinafter described in detail, with or without suction boxes; or it may be of other conventional type.

In the operation of the equipment disclosed in Figure 11, the use of an open breast roll, or equivalent structure, with or without suction mechanism, is of considerable importance. This is because the web-forming region in the structure as illustrated is located entirely upon the surface of the breast roll. In other words, the wire which is used as the web-forming member is entirely supported on the breast roll during the web-forming operation.

While, as previously stated, it is preferred in the operation of web-forming equipment in accordance with the invention that at least a substantial part of the water or other carrier fluid for the fiber shall flow through an unsupported portion of the forming member, the principles of the invention can be employed to advantage in mechanisms where the web-forming member is entirely supported within the web-forming region.

Web-forming equipment embodying a slice structure of the general type illustrated in Figure 11 is placed into operation and is adjusted for optimum performance in the same manner as described above in connection with the structure of Figures 3, 5 and 6.

The open type breast roll illustrated particularly in Figures 3, 5 and 6, is of a novel and special design, particularly adapted for, although not limited to, use with flow control mechanism in accordance with the present invention. The shape of the curved vanes 71 and the mode in which those vanes co-act with the other structural elements of the roll in such that the white water which flows through the web-forming member into the roll surface as that member passes through the web-forming region is retained within the cellular spaces provided in the periphery of the roll just long enough to enable the discharge of that liquid from the roll in the region beneath the web-forming member. In other words, this type of roll is not intended to hold the white water or other carrier fluid which passes through the web-forming member, for a period longer than that required to remove that fluid from the web-forming region to the disposal region when the fluid is discharged into a tray or otherwise returned to the supply system. The most satisfactory operation will result when the roll is of such design that the volume of the peripheral cellular spaces available to receive the white water passing through the wire is greater than the actual flow into the roll during operation of the apparatus, and the operation is also improved when the cellular spaces between the vanes communicate with each other, as previously described.

In the particular structure illustrated in Figures 3, 5 and 6, communication between the cellular spaces between the vanes 71 is accomplished by positioning the helical ribbon 79 so that it projects a substantial distance above the outer edge portions 75 of the vanes. It will be understood that other equivalent arrangements may, of course, be utilized for accomplishing the interconnecting of the roll spaces or cells. For example, in instances where the wire supporting means, such as the helical ribbon 79, is flush with the edges of the vanes, or where the vanes are set into a solid supporting shell, openings may be provided in the vanes themselves. Interconnecting openings or spaces of this nature may also be found advantageous in the structures shown in Figures 12 and 13, described below.

As previously pointed out, other types of open breast rolls, and especially rolls utilizing vacuum chambers or other means, can be utilized in the practice of the invention. An example of one such arrangement is illustrated in Figures 12 and 13. This structure includes a flow control mechanism 47 which, except for certain features of the slice structure, is essentially similar to the flow control unit illustrated in Figures 1–3, 5 and 6, and the corresponding structural elements bear the same reference numerals. The breast roll structure, however, embodies a suction breast roll which includes a plurality of suction box units which are operable to provide a negative pressure below the web-forming region. The actual structural arrangement of the roll is not critical, although for most satisfactory results, the volume of the cellular spaces provided in the periphery of the roll should be greater than the volume of fluid which will be received in those spaces. The raising of the helical winding relative to the edges of the vanes to provide communication between the cellular spaces will also give improved operation.

As illustrated in Figure 13, the roll includes a perforated outer shell 223, which is supported by suitable bearing means (not shown) for rotation in proper operating position. The periphery of the shell 223 is provided with a plurality of slots 225, extending axially of the roll, and these slots receive and support rectangularly-shaped bar members 227. The bar members 227 are slotted to receive a helically wound ribbon 229, which constitutes the actual support means for the forming wire 11. The helically wound ribbon 229 may be generally similar in dimensions and spacing to the ribbon 79 of the previously described embodiment. In any event, the dimensions of this ribbon and its spacing are such that the wire is adequately supported with minimum interference or obstruction of flow through the web-forming means. Also, as in the previously described structure, the helical winding 229 desirably projects above the edges of the vanes 227, so as to permit fluid circulation between the vane cells.

Internally of the roll shell 223, there is provided a plurality of suction box units, as illustrated at 231 and 233. The suction box units are separated from each other and the wall defining means therefor is provided with sealing means such as the strips 235, which are adapted to ride against the inner surface of the roll shell 223. During operation of the apparatus, a predetermined, reduced pressure can be maintained within each of these units, and this pressure will be available to reduce the pressure which is required within the flow control chamber 121 in order to maintain the desired pressure differential across the web-forming member within the web-forming region.

The slice mechanism used in conjunction with the flow control and suction breast roll structures illustrated in Figures 12 and 13 may be similar to the slice and discharge lip mechanisms illustrated in the structures shown in Figures 3 and 11. Under certain operating conditions, however, it may be desirable, in the use of apparatus in accordance with the invention, to utilize a hinged type slice mechanism which is also adjustable over fairly wide limits in a vertical direction, and a mechanism of this general type is illustrated in Figure 12.

As there shown, the hingedly and vertically adjustable slice mechanism includes a hingedly supported discharge lip or slice plate 237 which extends transversely across the machine. The slice plate 237 is supported upon the frame of the upper section 87 of the flow control unit by means of a pair of co-acting support elements 239 and 241, which are provided with cylindrical bearing portions arranged to engage a pintel 243 formed on the upstream section of the slice plate 237. The support elements 239 and 241 are in turn affixed to a transversely-extending member 245 which is engaged by, and supported upon, a transversely-extending beam section 247, which corresponds to the beam member 157 of the Figure 3 structure. The beam member 247 is affixed to the adjacent, transversely-extending portion 249 of the frame of the upper section 87 by means of suitable screw fastenings 251 which pass through slotted openings 253 in the web section of the beam.

The lower section of the transversely-extending frame member 249 is under-cut, as shown, and the upper and left-hand portions, respectively, of the members 239 and 245 fit therein, as shown in Figure 12. Clearances are provided, as shown at 255 and 257, whereby it is possible, by the operation of suitable mechanism (not shown) to move the beam support 247, and with it the entire slice mechanism, in the vertical direction.

The upstream edge surface 259 of the slice mechanism, which is the surface of the slice mechanism initially contacted by the flowing stream of stock within the flow control unit, is curved, similarly to the surfaces 145 and 209 of the previously described structures. This curved surface 259, which may be cylindrical in form, provides for the establishing of a line of stagnation points which extend transversely across the machine in the region where the flow within the flow control chamber 121 divides, a portion of the flow being recirculated through the passageway 126 and another portion passing out of the flow control chamber with the formed web. The arrangement is such that the line of stagnation points will be located, during normal operation, nearer to the forming wire 11 than to the adjacent surface of the flow control vane 125.

As in the previously described structure, the surface 261 of the slice plate, which surface overlies the forming wire 11 in the region downstream of the edge surface 259, is flat, and this surface defines with the forming wire 11, a passageway 263 of substantial length and of constantly decreasing cross-sectional area in the direction of wire movement. The under surface of the support member 239 merges smoothly into the surface 261.

The dimensions of the exit passageway 263 for the formed web, and the adjustment of the slice, will be effected as described in conjunction with the Figure 3 structure. To facilitate this, the slice plate 237 is provided with passageways 265, which may be connected to pressure indicating mechanisms similar to the passageways 195, and screw-operated, slice adjusting mechanisms 267 are connected to the slice plate 237 at spaced intervals across the machine.

The slice plate 237 includes edge seals 269, similar to the edge seals shown in Figure 7, and in order to assure a smooth flow path within the flow control unit, a transversely-extending strip 271 of resilient material is connected between the frame section 249 and the slice support member, 239, so as to bridge the gap 257 provided for vertical adjustment of the slice. The surfaces of this strip are faired into the adjacent defining surfaces of the flow passageway, as shown in Figure 12, and it will be evident that the arrangement provides a convenient means for maintaining a smooth flow passageway while, at the same time, permitting reasonable vertical adjustment of the slice mechanism.

In apparatus of the general type here disclosed, where the pressure differential is attained by progressive increase in the effective cross-sectional area of the flow path through which the fiber suspension is delivered to the forming member, the use of suction boxes, as illustrated in Figure 12, is of particular advantage in extending the possible range of operation of the apparatus. It will be understood that more than one suction box unit may be provided within the web-forming region in order to provide a series of differing pressure zones.

As in the previously described structure, the operation of the suction type roll is one of holding the fluid which passes through the web-forming member within the roll body during that interval in which the formed web is carried away from the web-forming region. The fluid may be discharged from the roll surface by centrifugal action shortly after the completion of the web-forming operation, or otherwise removed from the roll surface.

In the operation and adjustment of the equipment illustrated in Figures 12 and 13, the procedure to be followed will be exactly the same as that described in conjunction with the apparatus illustrated in Figures 1–3, 5 and 6, and the same operating limits and other conditions will apply. It is preferred in the operation of this equipment that a substantial percentage of the water which drains through the wire during the web-forming operation shall pass through the wire without flowing into the surface of the breast roll. The apparatus can be operated, however, under conditions where the entire web-forming region overlies the breast roll and, hence, substantially all of the flow through the wire passes into the roll surface. This latter mode of operation, although less desirable, is greatly improved when carried on in accordance with the formation principle of the present invention.

As previously pointed out, it is not necessary in the operation of flow control means in accordance with the invention that the layer of stock which is conducted away from the upper portion of the web-forming region shall be recirculated within the flow control unit. This division of the stock flow can be conducted away from the web-forming region and returned to some convenient point in the stock supply or white water system. Apparatus arranged to operate in this manner is illustrated in Figure 14. This mechanism is generally similar to the flow control mechanism illustrated in Figures 3 and 12. It includes a lower stationary section 281, which may be exactly the same in constructional details as the stationary section 49, and an upper or adjustable section 283, which is supported on the stationary section similar to the upper section 87 in the previously described embodiments. The upper section 283 is of fabricated construction. It includes oppositely arranged side walls 285, which are integrally connected together by suitable structural members 287 to define a generally horizontal box structure, and this structure is supported upon the flat upper surface of the frame portion of the stationary section 281, so as to be movable toward and away from the vertical center line of the breast roll 13b. The mechanism for accomplishing this movement may be exactly the same as illustrated in Figures 1 and 2.

The stock is delivered to the web-forming region via a conduit 291, which again is similar in construction and outline to the conduit 45 in the previously described structures, and the apron plate 293 which defines the lower surface of the flow conduit is likewise similar in construction and details to the apron plate 109. The lower surface of the outer or lip portion 295 of the apron plate 293 is thus cut-away, as shown, and this surface is curved so as to provide, with the adjacent surface of the wire 11, which is supported on the breast roll 13b, a passageway 297 of increasing cross-sectional area in the direction opposite to the direction of movement of the wire. The apron plate 293 is supported upon an underlying support plate 299, similar to the support plate 115.

The stream of stock which is delivered by the conduit 291 discharges into a flow control chamber or passageway 301, which overlies the web-forming region on the wire 11. The upper surface of the flow control chamber 301 is defined by a flow control vane 303, having a cross-sectional outline approximating that of a hydrofoil, and the connecting upper surface of the stock inflow conduit is defined by the lower surface of the support means 305 for the vane 303. The sides of the flow control chamber are defined by the two side plates 285, and the apparatus should include edge seals 307 and 309, similar to the seals 167 and 173 in the Figure 3 and Figure 12 embodiments. It may also include a deflector plate similar to the deflector 185.

In order to accomplish division of the flow within the flow control unit, the downstream end of the flow control chamber 301 connects with a flow conduit 311, which leads either to the stock supply system or to the white water system, by a curved passageway 313. The flow conduit 311 may be connected to a pump to provide further control of the pressure and flow conditions within the flow control chamber 301. The transverse walls of the passageway 313 are defined by the upper surface of the control vane 303 and the lower surface of a curved plate member 315, which extends between the two side plates 285, similar to the plate member 123.

To facilitate control of the pressure and pressure gradient within the flow control chamber 301, the control vane 303 is supported for limited rotative movement about its upstream end. The support means includes a pair of stub shafts 317, which project through suitable bearings in the side plates 285, and a bearing or guide portion 319 formed in the support members 305 and 321, which bearing engages a cylindrical section 323 at the upstream side of the vane 303.

As in the previously described structures, the surfaces which define the flow control chamber are formed so as to be coincident with the defining surfaces of streamlines assumed to exist under flow conditions capable of being expressed by the equation of potential flow.

For the purpose of preventing accumulation of fiber, which might interfere with the vane adjustment, the spaced upper surfaces of the vane 303 and the transverse vane support member 321 are connected by a resilient sealing strip 325, which is positioned as shown in Figure 14, so as to bridge the gap between these surfaces. The arrangement should be such that this strip is placed under sufficient tension to assure a smooth surface over the normal operating range of the apparatus. Downstream of the control vane 303, the slice mechanism and the other elements of the apparatus may be similar to the previously described structures. The particular structure illustrated is the same as in the Figure 3 mechanism and the same reference characters have been used.

The forming wire 11 is supported upon an open or suction type breast roll or equivalent means, indicated generally at 13b, as in the previously described embodiments of the invention. For example, open breast roll structure such as is illustrated in Figures 3 and 12, with or without suction mechanism can be used.

During the operation of the Figure 14 apparatus, it is desired that a substantial portion of the flow through the forming wire shall take place in a region where the wire is not supported on the breast roll, i. e. a substantial portion of the flow through the wire in the web-forming region will not pass into the surface of the breast roll or equivalent structure. This is accomplished by so positioning the flow control unit 283 that the stock delivery outlet extends downstream of the center line of the breast roll. Such flow through an unsupported section of the wire may produce a slight downward depression of the wire, and during operation, this depression of the wire may necessitate a compensating adjustment of the slice plate. No attempt has been made to illustrate the wire depression in the drawings of the various embodiments of the invention, but it will be understood that it will occur in all instances where that type of operation is carried on.

Apparatus of the general type shown in Figure 14 will operate substantially similar to the structures previously described. The design is such that the flow control chamber 301 provides a flow passageway of increasing effective cross-sectional area in the direction of movement of the forming member. By this means, progressive increase in the pressure within the web-forming region and a progressively increasing pressure differential across that member in the direction of its movement are attained. The adjustability of the vane makes possible control of this pressure and pressure differential over a considerable range of operating condition. The mechanism provides for the division of the flowing stream of stock which is delivered to the web-forming region into three main parts, one of which flows backwardly along the wire, as that member moves into the web-forming region, a second portion of which flows through the wire to form thereon the web, and the other portions, which includes the upper boundary layer, is continuously conducted away from the web-forming region. Provision is also made for minor flow out of the flow control chamber above the formed web through the passageway 165 provided by the slice structure.

When placing the apparatus of this type into operation, adjustment thereof may be carried on in substantially the same manner as in the previously described arrangements. The use of pressure taps in the side walls, such as indicated at 328, will be found very advantageous for this purpose. There is no material difference in the principles of operation, and the limits of the pressure and the pressure differential and the dimensions of the web-forming region, as previously set forth are equally pertinent here. The breast roll 13b or other support means for the forming member may likewise be in accordance with the previous disclosure.

The flow control mechanisms illustrated in Figures 3 and 12 include in their construction a liquid deflector plate (185), which prevents the backwardly flowing stream of stock which is discharged from the flow control chamber along the upstream edge of the web-forming region, from contacting the web-forming member which is moving into the web-forming region, except in the region adjacent the lip of the apron plate. In the operation of certain types of equipment in accordance with the invention, and especially equipment using an open-surfaced breast roll having curved blades (as in the Figure 3 arrangement), some difficulty has been experienced as a result of the air-pump action which is inherent in such blade constructions.

To avoid this difficulty, it will sometimes be found desirable to include in apparatus in accordance with the invention, a windage deflector, which may be combined with a liquid deflector similar to the plate 185, and such an arrangement is illustrated in Figure 15. In that view, there is shown a flow control unit which, except for the slice construction, is otherwise generally similar in its features to the structures shown in Figure 3, and the corresponding structural elements bear the same reference numerals.

The combination windage and fluid deflector mechanism embodied in this structure includes a stationary blade or baffle section 331 which extends transversely across the machine and which is supported upon the two side walls 175 of the frame of the stationary section 49 of the flow control unit. This baffle plate is in two sections; the upper section 333 is adapted to extend into close proximity to the wire 11 adjacent the forward edge of the lip 111 of the apron plate, and in this position, it serves to define the lower surface of the passageway 113 through which the backwardly flowing stream of stock is discharged from the flow control chamber. The lower section 335 constitutes a continuation of the upper section.

Intermediate the two sections, there is provided an air deflector baffle or blade 337, which is hingedly supported upon the two plate members 175, and which includes an outer lip portion 339 adapted to be disposed in close proximity to the surface of the wire, as illustrated. This baffle 337 co-acts with the lower section 335 of the stationary baffle 331 to collect and carry away air which is discharged through the wire surface as a result of the pumping action of the breast roll, and it is desirable that the ends of the passageway 341 formed between these two baffles shall be open in order to permit free discharge of the air. The passageway 341 may also be connected to a pump or other means for providing a zone of reduced pressure if that should be desired. The over-all effect of the arrangement is to provide a generally enclosed flow passageway for the backwardly flowing stream of stock discharged from the web-forming region, while at the same time, collecting and carrying away air from the surface of the web-forming member. Improved formation will result.

The slice lip mechanism illustrated in connection with the Figure 15 structure differs somewhat from the other slice lip constructions previously described. In effect, the arrangement constitutes a hinged slice lip 343 of about the same general cross-sectional outline as the construction illustrated in Figure 11, with the exception that the downstream edge of the slice is of sufficient thin material that it can be warped sufficiently to vary the dimensions of the gap between the edge of the slice and the wire.

The construction includes a transversely-extending beam member 345, which is generally similar to the beam 247 of the Figure 12 construction, and which is attached to the adjacent, transversely-extending element 347 of the frame of the upper section 87 by means of suitable screw fastenings 348, which pass through slotted openings 349 in the web section of the beam. These openings permit limited vertical adjustment of the slice structure.

Affixed to the beam 345 is a second transversely-extending structural member 351 having a downwardly-projecting portion 353, which is adapted to extend beneath the frame element 347 so as to define the downstream edge surface of the flow control chamber 121. A transversely-extending shaft 355 is rigidly supported upon the depending section 353 by means of a plurality of spaced-apart angularly disposed studs 357. The upstream end portion of the slice plate 343 is machined so as to engage this shaft and to be rotatable relative thereto. If desired, the shaft 355 may be relieved at intervals across the machine, as illustrated at 357, to minimize friction. Engaging bearing surfaces, concentric with the shaft 355, are provided at the lower end of the depending portion 353 and the adjacent surface of the slice plate 343, as illustrated at 359. These surfaces maintain a seal at the downstream edge of the flow control chamber.

In order to provide for vertical adjustment of the slice and limited warping of that member transversely across the machine, as previously described, the mechanism includes a plurality of spaced, screw adjusting units 361 which may be similar to the units 159 in the Figure 2 structure. The upper end of each of the screw adjusting units 361 is adjustably connected to the transversely-extending member 345 and the lower end is connected to the slice plate by means of an arm, as illustrated at 364.

As in the previously described structure, the slide 343 is provided at its upstream edge, i. e. the edge which is initially contacted by the flowing stream of stock within the flow control unit, with a curved surface 365 arranged to provide a line of stagnation points which extend transversely across the machine. This line of stagnation points will desirably be established nearer the wire than to the adjacent surface of the hydrofoil vane 125. The slice plate includes edge seals 367, similar to the edge seals shown in Figure 7.

The under surface 369 of the slice plate 343 which overlies the wire 11 is flat and defines with that surface a generally wedge-shaped passageway 363 of decreasing cross-sectional area in the direction of wire movement. The dimensions of the passageway 363 and the adjustment of the slice lip will be accomplished substantially as described in conjunction with the Figures 11 and 12 constructions. The arrangement, due to the hinged support for the slice plate, may be somewhat easier to adjust than the Figure 11 construction, which it most closely resembles.

When the various elements of the apparatus are positioned as shown in Figure 15, substantially all of the flow passing through the web-forming member in the web-forming region, will flow into the open cellular surface of the breast roll 13 and will be carried out of the web-forming region by that roll. As previously stated, it is generally preferred to operate in such manner that a substantial portion of the flow through the web-forming member will not pass into the roll, but operation is possible under conditions where substantially all the flow through the web-forming member does pass into the support member and in some web-forming mechanisms, it may be advantageous.

In the foregoing, and in my related applications, of which this is a continuation, I have disclosed a number of important and heretofore unknown principles in connection with the formation of fibrous webs by the use of fluid suspensions of fibrous materials. The present application extends the disclosure of certain of my prior applications, and in particular, it discloses further means whereby greatly improved web-formation can be accomplished by the use of flow control mechanism which is capable of effecting continuous control of the pressure and velocity relationships existing in the web-forming region, independently of each other and inedpendently of the movement of the web-forming member or its support.

The specific examples of the apparatus disclosed accomplish this control by the utilization of certain particular and critical designs of the flow passageway through which the fiber suspension is delivered to the web-forming region. The invention and the web-forming principles herein disclosed are capable of relatively wide application in the papermaking and other web-forming arts, although at the same time, they have particular utility in connection with the manufacture of fibrous papers webs by the use of Fourdrinier papermaking machines of the pressure forming type.

A particularly important advantage of the invention results from the inherent capability of web-forming apparatus as herein disclosed to produce a web which can be picked-up at the couch roll with much greater ease than is the case with the prior apparatus. This important improvement is believed to result in large part from the controlled pressure differential which is provided across the web-forming member in the web-forming region, although other factors probably contribute.

Various of the features of the invention believed to be new are set forth in the appended claims.

I claim:

1. In the manufacture of continuous fibrous webs, under pressure forming conditions, by the use of a confined flowing stream of a fluid suspension of fibrous material which is of generally rectangular cross-sectional outline, having a web-forming portion and at least one other portion which overlies the web-forming portion of said flowing stream, said web-forming portion being caused to flow into the contact with a moving, fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the portion of said flowing stream which overlies said web-forming portion to flow above said forming member under predetermined conditions of expanding flow to thereby effect a predetermined distribution of fluid pressure within the web-forming portion of said flowing stream in said web-forming region, and conducting away from adjacent the downstream end of said web-forming region said portion of said flowing stream which overlies said web-forming portion.

2. In the manufacture of continuous fibrous webs, under pressure forming conditions, by the use of a confined flowing stream of a fluid suspension of fibrous material which is of generally rectangular cross-sectional outline, having a web-forming portion and at least one other portion which forms the upper boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the upper boundary layer of said flowing stream to flow above said forming member under predetermined conditions of expanding curvilinear flow to thereby effect a predetermined distribution of fluid pressure within the web-forming portion of said flowing stream in said web-forming region, and conducting away from adjacent the downstream end of said web-forming region the upper boundary layer of said flowing stream.

3. In the manufacture of continuous fibrous webs, under pressure forming conditions, by the use of a confined flowing stream of a fluid suspension of fibrous material which is of generally rectangular cross-sectional outline, having a web-forming portion and at least one other portion which overlies the web-forming portion of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the portion of said flowing stream which overlies said web-forming portion to flow above said forming member under predetermined conditions of expanding curvilinear flow to thereby effect a predetermined distribution of fluid pressure within the web-forming portion of said flowing stream in said web-forming region, and conducting away from adjacent the downstream end of said web-forming region said portion of said flowing stream which overlies said web-forming portion under conditions such that said conducted away portion is recirculated into the flowing stream moving toward said web-forming region.

4. In the manufacture of continuous fibrous webs, under pressure forming conditions, by the use of a confined flowing stream of a fluid suspension of fibrous material which is of generally rectangular cross-sectional outline, having a web-forming portion and at least one other portion which forms the upper boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes through said web-forming region, the improvement which consists in selectively increasing the fluid pressure in the web-forming portion of the flowing stream in the web-forming region by causing the upper boundary layer of said flowing stream to flow above said forming member under predetermined conditions of expanding curvilinear flow to thereby establish a predetermined increasing fluid pressure distribution within the web-forming portion of said flowing stream in said web-forming region in the direction of movement of the forming member, and conducting away from adjacent the downstream end of said web-forming region the upper boundary layer of said flowing stream.

5. In the manufacture of continuous fibrous webs, under pressure forming conditions, by the use of a confined flowing stream of a fluid suspension of fibrous material which is of generally rectangular cross-sectional outline, having a web-forming portion and at least two other portions which form upper and lower boundary layers of said flowing stream, said web-forming portion being caused to flow into contact with a moving, fluid-permeable forming member in a web-forming region in such manner that the longitudinal axis of said web-forming portions extends in a direction generally parallel to the direction of movement of said forming member, as said member passes through said web-forming region, the improvement which comprises selectively increasing the fluid pressure in the web-forming portion of the flowing stream in the web-forming region by causing the portion of said flowing stream which forms said upper boundary layer to flow above said forming member under predetermined conditions of expanding curvilinear flow to thereby establish a predetermined distribution of fluid pressure within the web-forming portion of said flowing stream in the web-forming region, and conducting away from said web-forming region said other portions which form the upper and lower boundary layers of said flowing stream, the lower boundary layer being removed at the upstream end of said web-forming region and caused to flow backwardly along said forming member and the upper boundary layer being removed adjacent the downstream end of said web-forming region.

6. In the manufacture of continuous fibrous webs, under pressure forming conditions, by the use of a confined flowing stream of a fluid suspension of fibrous material which is of generally rectangular cross-sectional outline, having a web-forming portion and at least two other portions which form upper and lower boundary layers of said flowing stream, said web-forming portion being caused to flow into contact with a moving fluid-permeable forming member in a web-forming region in such manner that the longitudinal axis of said web-forming portions extends in a direction generally parallel to the direction of movement of said forming member, as said member passes through said web-forming region, the improvement which comprises selectively increasing the fluid pressure in the web-forming portion of the flowing stream in the web-forming region by causing the portion of said flowing stream which forms said upper boundary layer to flow above said forming member under predetermined conditions of expanding curvilinear flow to thereby establish a predetermined increasing fluid pressure distribution within the web-forming portion of said flowing stream in the web-forming region in the direction of movement of the forming member, and conducting away from said web-forming region said other portions which form the upper and lower boundary layers of the flowing stream, the lower boundary layer being removed from adjacent the upstream end of said web-forming region and caused to flow backwardly along said forming member and the upper boundary layer being removed adjacent the downstream end of said web-forming region.

7. In the manufacture of continuous fibrous webs, under pressure forming conditions, by the use of a confined flowing stream of a fluid suspension of fibrous material which is of generally rectangular cross-sectional outline, having a web-forming portion and at least two other portions which form upper and lower boundary layers of said flowing stream, said web-forming portion being caused to flow into contact with a moving, fluid-permeable forming member in a web-forming region in such manner that the longitudinal axis of said web-forming portions extends in a direction generally parallel to the direction of movement of said forming member, as said member passes through said web-forming region, the improvement which comprises selectively increasing the fluid pressure in the web-forming portion of the flowing stream in the web-forming region by causing the portion of said flowing stream which forms said upper boundary layer to flow above said forming member under predetermined conditions of expanding curvilinear flow to thereby establish a predetermined increasing fluid pressure distribution within the web-forming portion of said flowing stream in the web-forming region in the direction of movement of the forming member and conducting away from said web-forming region said other portions which form the upper and lower boundary layers of said flowing stream, the lower boundary layer being removed from adjacent the upstream end of said web-forming region and caused to flow backwardly along said forming member and the upper boundary layer being removed adjacent the downstream end of said web-forming region and caused to be recirculated into the flowing stream moving toward said web-forming region.

8. In the manufacture of continuous fibrous webs, under pressure forming conditions, by the use of a confined flowing stream of a fluid suspension of fibrous material which is of generally rectangular cross-sectional outline, having a web-forming portion and at least two other portions which form upper and lower boundary layers of said flowing stream, said web-forming portion being caused to flow into contact with a moving, fluid-permeable forming member in a web-forming region in such manner that the longitudinal axis of said web-forming portions extends in a direction generally parallel to the direction of movement of said forming member, as said member passes through said web-forming region, the improvement which comprises delivering the flowing stream of fluid to said web-forming region in a condition of fine-scale turbulence and selectively increasing the fluid pressure in the web-forming portion of the flowing stream in the web-forming region by causing the portion of said flowing stream which forms said upper boundary layer to flow above said forming member under predetermined conditions of expanding curvilinear flow to thereby establish a predetermined distribution of fluid pressure within the web-forming portion of said flowing stream in the web-forming region, and conducting away from said web-forming region said other portions which form the upper and lower boundary layers of said flowing stream, the lower boundary layer being removed from adjacent the upstream end of said web-forming region and caused to flow backwardly along said forming member and the upper boundary layer being removed adjacent the downstream end of said web-forming region and caused to be recirculated into the flowing stream moving toward said web-forming region.

9. In web-forming apparatus of the pressure forming type, a continuous web-forming member, means for supporting said member and for moving said member through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and outflow openings, and through which the fluid delivered to said web-forming region is caused to flow, and a transversely extending, stationary, smooth-surfaced flow control member disposed within said chamber, said flow control member being of such form and being so positioned relative to said web-forming member that a portion of the flowing stream passing above said forming member and between said forming member and said flow control member is caused to flow under predetermined conditions of expanding curvilinear flow to thereby establish a predetermined distribution of fluid pressure within the flowing stream in the web-forming region adjacent the forming member.

10. In web-forming apparatus of the pressure forming type, a continuous web-forming member, means for supporting said member and for moving said member through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and outflow openings, and through which the fluid delivered to said web-forming region is caused to flow, a transversely extending, stationary, smooth-surfaced vane member disposed within said chamber, and a transversely extending auxiliary throttling vane member positioned adjacent the inflow opening of said flow control chamber, said first mentioned vane member being of such form and being so positioned relative to said web-forming member that a portion of the flowing stream passing above said forming member and between said forming member and said first mentioned vane member is caused to flow under predetermined conditions of expanding curvilinear flow to thereby establish a predetermined distribution of fluid pressure within the flowing stream in the web-forming region adjacent the forming member independently of the velocity of said forming member.

11. In web-forming apparatus of the pressure forming type, a continuous web-forming member, means for supporting said member and for moving said member through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and outflow openings, and through which the fluid delivered to said web-forming region is caused to flow, and a transversely extending, stationary, smooth-surfaced hydrofoil vane member disposed within said chamber, said hydrofoil vane member being of such form and being so positioned relative to said web-forming member that a portion of the flowing stream passing above said forming member and between said forming member and said hydrofoil vane member is caused to flow under predetermined conditions of expanding curvilinear flow to thereby establish a predetermined distribution of fluid pressure within the flowing stream in the web-forming region adjacent the forming member, the downstream edge of said outflow opening having an inclined edge portion which defines with the forming member a passageway of decreasing cross-sectional area in the direction of movement of the forming member through which the web which is laid down on the forming member passes out of said flow control unit.

12. In web-forming apparatus of the pressure forming type, a continuous web-forming member, means for supporting said member and for moving said member through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and outflow openings, and through which the fluid delivered to said web-forming region is caused to flow, and a transversely extending, adjustable, stationary, smooth-surfaced vane member disposed within said chamber, said vane member being of such form and being so positionable relative to said flow control chamber and web-forming member that a portion of the flowing stream passing above said forming member and between said forming member and said vane member is caused to flow under predetermined conditions of expanding curvilinear flow to thereby establish a predetermined distribution of fluid pressure within the flowing stream in the web-forming region adjacent the forming member independently of the velocity of said forming member and so that there is provided within said flow control chamber a re-entrant passageway through which at least most of said expanding portion of said flowing stream is caused to recirculate.

13. In web-forming apparatus of the pressure forming type, a continuous web-forming member, an open-surfaced type breast roll supporting said member for movement into and through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at, and being substantially co-extensive with, the outflow opening of said flow control unit, said flow control unit including means defining the walls of a flow control chamber which is closed except for said inflow and outflow openings, and through which the fluid delivered to said web-forming region is caused to flow, a transversely extending, adjustable, stationary, smooth-surfaced vane member disposed within said chamber, and an adjustable, transversely extending, auxiliary throttling vane member positioned adjacent the inflow opening of said flow control chamber, said first mentioned vane member being of such form and being so positionable relative to said flow control chamber and web-forming member that a portion of the flowing stream passing above said forming member and between said forming member and said first mentioned vane member is caused to flow under predetermined conditions of expanding curvilinear flow to thereby establish a predetermined distribution of fluid pressure within the flowing stream in the web-forming region adjacent the forming member independently of the velocity of said forming member and so that there is provided within said flow control chamber a re-entrant passageway through which at least most of said expanding portion of said flowing stream is caused to recirculate.

14. Apparatus as defined in claim 13 wherein the breast roll comprises a central support, a plurality of elongated vane members disposed at the outer surface of said roll so as to extend longitudinally therealong, said spaced vane members defining a plurality of cellular spaces at the roll surface, and the structure of said roll including passageways which directly interconnect said cellular spaces.

15. In web-forming apparatus of the pressure forming type, a continuous web-forming member, a breast roll supporting said member for movement into and through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and outflow openings, and through which the fluid delivered to said web-forming region is caused to flow, and a transversely extending, stationary, smooth-surfaced vane member disposed within said chamber, said vane member being of such form and being so positioned relative to said web-forming member that a portion of the flowing stream passing above said forming member and between said forming member and said vane member is caused to flow under predetermined conditions of expanding curvilinear flow to thereby establish a predetermined distribution of fluid pressure within the flowing stream in the web-forming region adjacent the forming member, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of fluid which is delivered to said web-forming region will flow, under stable flow conditions, between said lip and said forming member in a direction opposite to the direction of movement of said forming member during the operation of said apparatus, and the leading edge portion of the slice plate being of such shape and so positioned relative to the surface of said vane member that another portion of the flowing stream of stock which is delivered to said web-forming region is continuously directed away from said web-forming region under stable flow conditions during the operation of said apparatus.

16. In web-forming apparatus of the pressure forming type, a continuous web-forming member, means for supporting said member and for moving said member through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a first passageway through which the fluid delivered to said web-forming region is caused to flow, said wall defining means including a transversely extending, stationary, smooth-surfaced control member, said control member being of such form and being so positioned relative to said web-forming member that a portion of said flowing stream passes within said first passageway above said forming member under predetermined conditions of expanding curvilinear flow to thereby establish a predetermined distribution of fluid pressure within the flowing stream in the web-forming region adjacent the forming member, the downstream edge of said outflow opening being defined by a slice member, the leading edge of said slice member being of such shape and so positioned relative to said flow control member that it divides said flowing stream into two portions, said slice member having a surface adjacent said leading edge which is spaced from and cooperates with a portion of the surface of said control member to provide a second passageway which connects with said first passageway and through which one of the divisions of said stream is conducted away from said web-forming region.

17. In web-forming apparatus of the pressure forming type, a continuous web-forming member, a breast roll supporting said member for movement into and through the web-forming region of said apparatus, a source of supply of a fluid suspension of a fibrous material, and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a first passageway through which the fluid delivered to said web-forming region is caused to flow, said wall defining means including a transversely extending, stationary, smooth-surfaced control member, said control member being of such form and being so positioned relative to said web-forming member that a portion of said flowing stream passes within said first passageway above said forming member under predetermined conditions of expanding curvilinear flow to thereby establish a predetermined distribution of fluid pressure within the flowing stream in the web-forming region adjacent the forming member, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of fluid which is delivered to said web-forming region will flow, under stable flow conditions, between said lip and said forming member in a direction opposite to the direction of movement of said forming member during the operation of said apparatus, and the leading edge of said slice plate being of such shape and so positioned relative to said flow control member that it divides said flowing stream into two portions, said slice member having a surface adjacent said leading edge which is spaced from and cooperates with a portion of the surface of said control member to provide a second passageway which connects with said first passageway and through which one of the divisions of said stream is conducted away from said web-forming region under stable flow conditions during the operation of said apparatus.

References Cited in the file of this patent

UNITED STATES PATENTS

| Number | Name | Date |
|---|---|---|
| 809,073 | McNaught | Jan. 2, 1906 |
| 838,686 | Case | Dec. 18, 1906 |
| 902,505 | Parker | Oct. 27, 1908 |
| 1,492,563 | Headson | May 6, 1924 |
| 1,534,080 | Russell | Apr. 21, 1925 |
| 1,553,948 | Lobb | Sept. 15, 1925 |
| 1,583,981 | Liebeck | May 11, 1926 |
| 1,836,243 | Haug | Dec. 15, 1931 |
| 2,118,491 | Chuse | May 24, 1938 |
| 2,127,698 | Niks | Aug. 23, 1938 |
| 2,171,739 | Berry | Sept. 5, 1939 |
| 2,225,435 | Kellett et al. | Dec. 17, 1940 |
| 2,259,859 | Covey | Oct. 21, 1941 |
| 2,281,293 | Lang | Apr. 28, 1942 |
| 2,344,281 | Berry et al. | Mar. 13, 1944 |
| 2,384,912 | Helin | Sept. 18, 1945 |
| 2,418,600 | Ostertag et al. | Apr. 8, 1947 |
| 2,421,829 | Clem | June 10, 1947 |
| 2,520,327 | Nilson | Aug. 29, 1950 |
| 2,535,732 | Goodwillie | Dec. 26, 1950 |
| 2,550,774 | Clem | May 1, 1951 |
| 2,677,316 | Heys | May 4, 1954 |
| 2,677,991 | Goumeniouk | May 11, 1954 |

FOREIGN PATENTS

| Number | Country | Date |
|---|---|---|
| 189,059 | Germany | Oct. 1, 1907 |
| 535,589 | Germany | Sept. 24, 1931 |

OTHER REFERENCES

Modern Pulp and Paper Making 2nd ed., by Whitham, page 388. Reinhold Publishing Corp., New York (1942).